US012532324B2

(12) United States Patent
Ly et al.

(10) Patent No.: US 12,532,324 B2
(45) Date of Patent: Jan. 20, 2026

(54) TECHNIQUES FOR DYNAMIC TRANSMISSION PARAMETER ADAPTATION

(71) Applicant: QUALCOMM Incorporated, San Diego, CA (US)

(72) Inventors: Hung Dinh Ly, San Diego, CA (US); Yu Zhang, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 519 days.

(21) Appl. No.: 17/941,967

(22) Filed: Sep. 9, 2022

(65) Prior Publication Data
US 2024/0089975 A1    Mar. 14, 2024

(51) Int. Cl.
*H04W 72/12*    (2023.01)
*H04W 72/04*    (2023.01)
*H04W 72/1268*    (2023.01)
*H04W 72/23*    (2023.01)
*H04W 72/51*    (2023.01)

(52) U.S. Cl.
CPC ....... *H04W 72/23* (2023.01); *H04W 72/1268* (2013.01); *H04W 72/51* (2023.01)

(58) Field of Classification Search
CPC ... H04L 1/0001; H04L 1/0025; H04L 5/0053; H04W 72/1268; H04W 72/23; H04W 72/51
See application file for complete search history.

(56) References Cited

U.S. PATENT DOCUMENTS

| 10,721,765 | B2 | 7/2020 | Park | |
| 2019/0104543 | A1* | 4/2019 | Park | H04W 74/006 |
| 2020/0107266 | A1* | 4/2020 | Liao | H04W 76/28 |
| 2020/0351738 | A1* | 11/2020 | Huang | H04W 36/06 |

(Continued)

FOREIGN PATENT DOCUMENTS

| EP | 4185037 B1 * | 5/2024 | H04L 5/0053 |
| KR | 20220116510 A * | 8/2022 | H04W 72/23 |
| TW | 202105953 A * | 2/2021 | H04L 1/0001 |

OTHER PUBLICATIONS

International Search Report and Written Opinion - PCT/US2023/070615—ISA/EPO—Nov. 8, 2023.

*Primary Examiner* — Wutchung Chu
(74) *Attorney, Agent, or Firm* — Holland & Hart LLP

(57) ABSTRACT

Methods, systems, and devices for wireless communications are described. A user equipment (UE) may receive, from a network entity, a first control message indicating sets of transmission parameters associated with dynamic transmission parameter adaptation. The UE may receive a second control message including an indication to switch from communicating with the network entity in accordance with a first set of transmission parameters to communicating with the network entity in accordance with a second set of transmission parameters. The UE may communicate one or more messages with the network entity based on a switch, in response to the second control message, from the first set of transmission parameters to the second set of transmission parameters in accordance with a parameter switching timeline for the dynamic transmission parameter adaptation.

25 Claims, 15 Drawing Sheets

(56) References Cited

U.S. PATENT DOCUMENTS

| | | | |
|---|---|---|---|
| 2021/0184824 A1 | 6/2021 | Kwak et al. | |
| 2021/0321382 A1* | 10/2021 | Nam | H04B 7/0695 |
| 2022/0394619 A1* | 12/2022 | Berggren | H04W 76/28 |
| 2023/0292314 A1* | 9/2023 | Chin | H04W 72/1268 |
| 2023/0397206 A1* | 12/2023 | Deogun | H04L 5/0098 |
| 2023/0397224 A1* | 12/2023 | Lai | H04W 52/0216 |
| 2024/0031103 A1* | 1/2024 | Liu | H04L 5/0051 |
| 2024/0073765 A1* | 2/2024 | Shrivastava | H04W 36/0072 |
| 2024/0340803 A1* | 10/2024 | Shim | H04W 52/38 |

* cited by examiner

TECHNIQUES FOR DYNAMIC TRANSMISSION PARAMETER ADAPTATION

FIELD OF TECHNOLOGY

The following relates to wireless communications, including techniques for dynamic transmission parameter adaptation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for dynamic transmission parameter adaptation. For example, the described techniques provide for a parameter switching timeline to support dynamic transmission parameter adaptation. A network entity may dynamically adapt transmission parameters at the network entity to reduce network power consumption. A UE may switch between network entity-side parameter sets for transmission parameter adaptation in accordance with the parameter switching timeline. The parameter switching timeline may include a transient time (e.g., a time between receiving a configuration update indication to applying the indicated configuration), a parameter reconfiguration gap (e.g., a gap between a current configuration and an indicated configuration), and a duration between configuration updates. The UE may be configured to operate or communicate in accordance with the parameter switching timeline to support dynamic transmission parameter adaptation. The parameter switching timeline may be preconfigured or based on UE capability. For example, the UE may indicate supported or minimum supported times for the durations, timers, or gaps of the transmission parameter adaptation timeline. In some examples, a starting symbol or slot for these durations may be based on a type of signaling used to send the configuration update indication. The durations may be defined or configured with respect to symbols, slots, or frames, and may be determined with respect to a subcarrier spacing of a current configuration, a subcarrier spacing of the second configuration, or a fixed subcarrier spacing.

A method for wireless communications at a UE is described. The method may include receiving, from a network entity, a first control message indicating a set of multiple sets of transmission parameters associated with dynamic transmission parameter adaptation, receiving a second control message including an indication to switch from communicating with the network entity in accordance with a first set of transmission parameters of the set of multiple sets of transmission parameters to communicating with the network entity in accordance with a second set of transmission parameters, and communicating one or more messages with the network entity based on a switch, in response to the second control message, from the first set of transmission parameters to the second set of transmission parameters in accordance with a parameter switching timeline for the dynamic transmission parameter adaptation of the set of multiple sets of transmission parameters.

An apparatus for wireless communications at a UE is described. The apparatus may include a processor, memory coupled with the processor, and instructions stored in the memory. The instructions may be executable by the processor to cause the apparatus to receive, from a network entity, a first control message indicating a set of multiple sets of transmission parameters associated with dynamic transmission parameter adaptation, receive a second control message including an indication to switch from communicating with the network entity in accordance with a first set of transmission parameters of the set of multiple sets of transmission parameters to communicating with the network entity in accordance with a second set of transmission parameters, and communicate one or more messages with the network entity based on a switch, in response to the second control message, from the first set of transmission parameters to the second set of transmission parameters in accordance with a parameter switching timeline for the dynamic transmission parameter adaptation of the set of multiple sets of transmission parameters.

Another apparatus for wireless communications at a UE is described. The apparatus may include means for receiving, from a network entity, a first control message indicating a set of multiple sets of transmission parameters associated with dynamic transmission parameter adaptation, means for receiving a second control message including an indication to switch from communicating with the network entity in accordance with a first set of transmission parameters of the set of multiple sets of transmission parameters to communicating with the network entity in accordance with a second set of transmission parameters, and means for communicating one or more messages with the network entity based on a switch, in response to the second control message, from the first set of transmission parameters to the second set of transmission parameters in accordance with a parameter switching timeline for the dynamic transmission parameter adaptation of the set of multiple sets of transmission parameters.

A non-transitory computer-readable medium storing code for wireless communications at a UE is described. The code may include instructions executable by a processor to receive, from a network entity, a first control message indicating a set of multiple sets of transmission parameters associated with dynamic transmission parameter adaptation, receive a second control message including an indication to switch from communicating with the network entity in accordance with a first set of transmission parameters of the set of multiple sets of transmission parameters to communicating with the network entity in accordance with a second set of transmission parameters, and communicate one or more messages with the network entity based on a switch, in response to the second control message, from the first set of transmission parameters to the second set of transmission parameters in accordance with a parameter switching timeline for the dynamic transmission parameter adaptation of the set of multiple sets of transmission parameters.

In some examples of the method, apparatuses, and non-transitory computer-readable medium described herein, the parameter switching timeline includes a first time gap for switching between the first set of transmission parameters to the second set of transmission parameters, a second time gap between receiving the indication and applying the second set of transmission parameters, and a third time gap between indications to switch sets of transmission parameters.

Some examples of the method, apparatuses, and non-transitory computer-readable medium described herein may further include operations, features, means, or instructions for transmitting control signaling indicating a UE capability associated with the parameter switching timeline.

In some examples of the method, apparatuses, and non-transitory computer-readable medium described herein, transmitting the control signaling may include operations, features, means, or instructions for transmitting the control signaling indicating a set of multiple supported parameter switching timelines including at least the parameter switching timeline.

In some examples of the method, apparatuses, and non-transitory computer-readable medium described herein, transmitting the control signaling may include operations, features, means, or instructions for transmitting the control signaling indicating the parameter switching timeline from a set of multiple parameter switching timelines.

In some examples of the method, apparatuses, and non-transitory computer-readable medium described herein, transmitting the control signaling may include operations, features, means, or instructions for transmitting the control signaling indicating a first supported time gap for switching between the first set of transmission parameters to the second set of transmission parameters, a second supported time gap between receiving the indication and applying the second set of transmission parameters, and a third supported time gap between indications to switch sets of transmission parameters, or any combination thereof.

In some examples of the method, apparatuses, and non-transitory computer-readable medium described herein, receiving the second control message may include operations, features, means, or instructions for receiving a downlink control information message including a first indication to switch from the first set of transmission parameters to the second set of transmission parameters, where a timer associated with the switch begins from a last symbol of a control resource set used to transmit the downlink control information message.

In some examples of the method, apparatuses, and non-transitory computer-readable medium described herein, receiving the second control message may include operations, features, means, or instructions for receiving a medium access control message including a first indication to switch from the first set of transmission parameters to the second set of transmission parameters and transmitting a feedback message in response to the medium access control message, where a timer associated with the switch begins from a slot used to transmit the feedback message.

Some examples of the method, apparatuses, and non-transitory computer-readable medium described herein may further include operations, features, means, or instructions for receiving control signaling indicating that a timer duration associated with the switch begins from a last symbol of a control resource set used to transmit the control signaling.

In some examples of the method, apparatuses, and non-transitory computer-readable medium described herein, the parameter switching timeline may be based on a subcarrier spacing of a physical channel.

Some examples of the method, apparatuses, and non-transitory computer-readable medium described herein may further include operations, features, means, or instructions for receiving control signaling indicating a subcarrier spacing associated with the parameter switching timeline.

In some examples of the method, apparatuses, and non-transitory computer-readable medium described herein, the parameter switching timeline may be based on a first time gap for switching between the first set of transmission parameters to the second set of transmission parameters, a second time gap between receiving the indication and applying the second set of transmission parameters, and a third time gap between indications to switch sets of transmission parameters, or any combination thereof.

In some examples of the method, apparatuses, and non-transitory computer-readable medium described herein, the first time gap, the second time gap, or the third time gap, or any combination thereof, correspond to a quantity of symbols, slots, or frames, or any combination thereof.

Some examples of the method, apparatuses, and non-transitory computer-readable medium described herein may further include operations, features, means, or instructions for dropping a scheduled communication during a time gap after switching to the second set of transmission parameters and before communicating in accordance with the second set of transmission parameters.

Some examples of the method, apparatuses, and non-transitory computer-readable medium described herein may further include operations, features, means, or instructions for transmitting a scheduled message after receiving the second control message and before switching to the second set of transmission parameters in accordance with the first set of transmission parameters and the parameter switching timeline.

Some examples of the method, apparatuses, and non-transitory computer-readable medium described herein may further include operations, features, means, or instructions for receiving a scheduled message after receiving the second control message and before switching to the second set of transmission parameters in accordance with the first set of transmission parameters and the parameter switching timeline.

Some examples of the method, apparatuses, and non-transitory computer-readable medium described herein may further include operations, features, means, or instructions for dropping a scheduled communication after receiving the second control message and before switching to the second set of transmission parameters in accordance with the parameter switching timeline.

A method for wireless communications at a network entity is described. The method may include transmitting, to a UE, a first control message indicating a set of multiple sets of transmission parameters associated with dynamic transmission parameter adaptation, transmitting a second control message including an indication to switch from communicating with the network entity in accordance with a first set of transmission parameters of the set of multiple sets of transmission parameters to communicating in accordance with a second set of transmission parameters of the set of multiple sets of transmission parameters, and communicating one or more message with the network entity based on a switch, in response to the second control message, from the first set of transmission parameters to the second set of transmission parameters in accordance with a parameter switching timeline for the dynamic transmission parameter adaptation.

An apparatus for wireless communications at a network entity is described. The apparatus may include a processor, memory coupled with the processor, and instructions stored in the memory. The instructions may be executable by the processor to cause the apparatus to transmit, to a UE, a first control message indicating a set of multiple sets of transmission parameters associated with dynamic transmission parameter adaptation, transmit a second control message including an indication to switch from communicating with the network entity in accordance with a first set of transmission parameters of the set of multiple sets of transmission parameters to communicating in accordance with a second set of transmission parameters of the set of multiple sets of transmission parameters, and communicate one or more message with the network entity based on a switch, in response to the second control message, from the first set of transmission parameters to the second set of transmission parameters in accordance with a parameter switching timeline for the dynamic transmission parameter adaptation.

Another apparatus for wireless communications at a network entity is described. The apparatus may include means for transmitting, to a UE, a first control message indicating a set of multiple sets of transmission parameters associated with dynamic transmission parameter adaptation, means for transmitting a second control message including an indication to switch from communicating with the network entity in accordance with a first set of transmission parameters of the set of multiple sets of transmission parameters to communicating in accordance with a second set of transmission parameters of the set of multiple sets of transmission parameters, and means for communicating one or more message with the network entity based on a switch, in response to the second control message, from the first set of transmission parameters to the second set of transmission parameters in accordance with a parameter switching timeline for the dynamic transmission parameter adaptation.

A non-transitory computer-readable medium storing code for wireless communications at a network entity is described. The code may include instructions executable by a processor to transmit, to a UE, a first control message indicating a set of multiple sets of transmission parameters associated with dynamic transmission parameter adaptation, transmit a second control message including an indication to switch from communicating with the network entity in accordance with a first set of transmission parameters of the set of multiple sets of transmission parameters to communicating in accordance with a second set of transmission parameters of the set of multiple sets of transmission parameters, and communicate one or more message with the network entity based on a switch, in response to the second control message, from the first set of transmission parameters to the second set of transmission parameters in accordance with a parameter switching timeline for the dynamic transmission parameter adaptation.

Some examples of the method, apparatuses, and non-transitory computer-readable medium described herein may further include operations, features, means, or instructions for receiving control signaling indicating a UE capability associated with the parameter switching timeline.

In some examples of the method, apparatuses, and non-transitory computer-readable medium described herein, receiving the control signaling may include operations, features, means, or instructions for receiving the control signaling indicating a set of multiple supported parameter switching timelines including at least the parameter switching timeline.

In some examples of the method, apparatuses, and non-transitory computer-readable medium described herein, receiving the control signaling may include operations, features, means, or instructions for receiving the control signaling indicating the parameter switching timeline from a set of multiple parameter switching timelines.

In some examples of the method, apparatuses, and non-transitory computer-readable medium described herein, receiving the control signaling may include operations, features, means, or instructions for receiving the control signaling indicating a first supported time gap for switching between the first set of transmission parameters to the second set of transmission parameters, a second supported time gap between receiving the indication and applying the second set of transmission parameters, and a third supported time gap between indications to switch sets of transmission parameters, or any combination thereof.

In some examples of the method, apparatuses, and non-transitory computer-readable medium described herein, transmitting the second control message may include operations, features, means, or instructions for transmitting a downlink control information message including a first indication to switch from the first set of transmission parameters to the second set of transmission parameters, where a timer associated with the switch begins from a last symbol of a control resource set used to transmit the downlink control information message.

In some examples of the method, apparatuses, and non-transitory computer-readable medium described herein, transmitting the second control message may include operations, features, means, or instructions for transmitting a medium access control message including a first indication to switch from the first set of transmission parameters to the second set of transmission parameters and receiving a feedback message in response to the medium access control message, where a timer associated with the switch begins from a slot used to transmit the feedback message.

Some examples of the method, apparatuses, and non-transitory computer-readable medium described herein may further include operations, features, means, or instructions for transmitting control signaling indicating that a timer duration associated with the switch begins from a last symbol of a control resource set used to transmit the control signaling.

Some examples of the method, apparatuses, and non-transitory computer-readable medium described herein may further include operations, features, means, or instructions for transmitting control signaling indicating a subcarrier spacing associated with the parameter switching timeline.

Some examples of the method, apparatuses, and non-transitory computer-readable medium described herein may further include operations, features, means, or instructions for receiving a scheduled message after receiving the second control message and before switching to the first set of transmission parameters in accordance with the first set of transmission parameters and the parameter switching timeline.

Some examples of the method, apparatuses, and non-transitory computer-readable medium described herein may further include operations, features, means, or instructions for transmitting a scheduled message after receiving the second control message and before switching to the first set of transmission parameters in accordance with the first set of transmission parameters and the parameter switching timeline.

DETAILED DESCRIPTION

Figure 1:
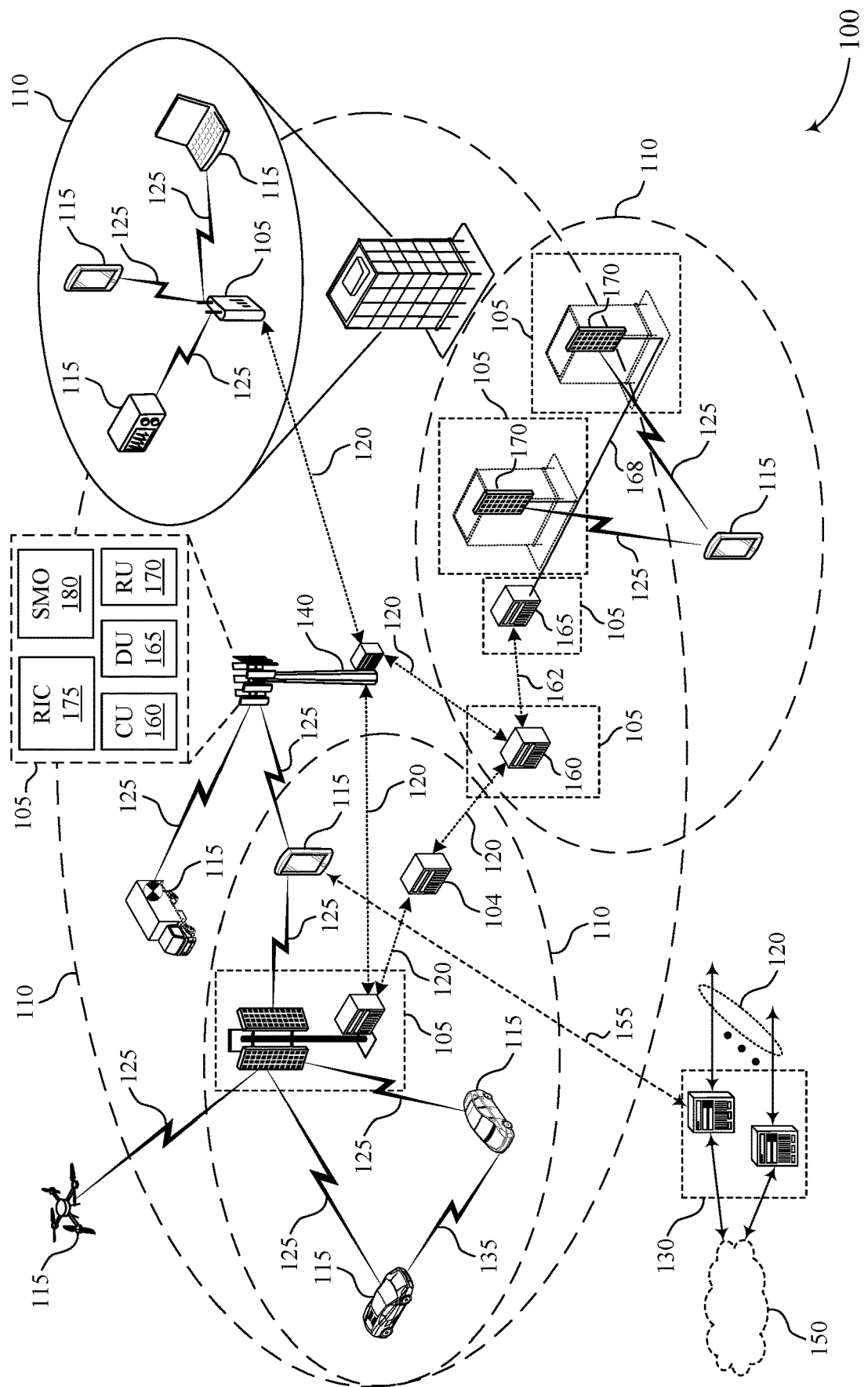
FIG. 1 illustrates an example of a wireless communications system that supports techniques for dynamic transmission parameter adaptation in accordance with one or more aspects of the present disclosure.

A network entity may dynamically adapt transmission parameters at the network entity to reduce network power consumption. For example, the network entity may modify a quantity of antenna ports used at a network entity antenna or a transmission power used for downlink signals and channels. The network entity may be capable of quickly adjusting transmission parameters. For example, the network entity may be capable of dynamically adapting transmission parameters within a slot or less. However, fast transmission parameter adaptation may affect complexity, since the UE may update the system parameters often, and performance at a user equipment (UE) communicating with the network entity. For example, measurements for channel state information (CSI), radio link monitoring (RLM), radio resource management (RRM) or beam management under different transmission parameters may not be combined or averaged to obtain a reliable measurement. For example, if transmission parameter sets switch unexpectedly, the UE may not be able to obtain a reliable measurement by combining measurements under two separate transmission parameter sets.

Wireless communications systems described herein support a parameter switching timeline for dynamic transmission parameter adaptation. A UE may switch between network entity-side parameter sets for transmission parameter adaptation in accordance with the parameter switching timeline. For example, the UE may switch to a second set of transmission parameters in accordance with the parameter switching timeline, reducing network-side power consumption without increasing UE complexity. The parameter switching timeline may, for example, enable the UE to average or combine measurements at an end of a period using a first set of transmission parameters (e.g., prior to switching to a second set of transmission parameters) to obtain accurate and reliable measurements for communications in accordance with the first set of transmission parameters.

The parameter switching timeline may include a transient time (e.g., a time between receiving a configuration update indication to applying the indicated configuration), a parameter reconfiguration gap (e.g., a gap between a current configuration and an indicated configuration), and a duration between configuration updates. The UE may be configured to operate or communicate in accordance with the parameter switching timeline to support dynamic transmission parameter adaptation. The parameter switching timeline may be preconfigured or based on UE capability. For example, the UE may indicate supported or minimum supported times for the durations, timers, or gaps of the transmission parameter adaptation timeline. In some examples, a starting symbol or slot for these durations may be based on a type of signaling used to send the configuration update indication. The durations may be defined or configured with respect to symbols, slots, or frames, and may be determined with respect to a subcarrier spacing of a current configuration, a subcarrier spacing of the second configuration, or a fixed subcarrier spacing.

Such implementations of the subject matter described in this disclosure can also be implemented to realize one or more of the following potential advantages. For example, in accordance with performing dynamic transmission parameter adaptation according to a parameter switching timeline, a network entity may switch between transmission parameter sets to reduce network-side power consumption without impacting UE complexity or procedures. These techniques may reduce power consumption from the network entity, such as by changing a transmit power for downlink signaling or changing a quantity of antenna ports used by the network entity. The parameter switching timeline may provide the UE with sufficient time to retune or modify radiofrequency components of the UE for the updated parameter set. Additionally, the parameter switching timeline may inform the UE of when parameter sets may be updated, which may ensure or increase the likelihood that transmission parameters are unchanged for certain intervals of the parameter switching timeline. The UE may perform measurements when the parameters are consistent or prepare to reset time-frequency tracking loops when the transmission parameter set is about to be updated.

Aspects of the disclosure are initially described in the context of wireless communications systems. Aspects of the disclosure are further illustrated by and described with reference to apparatus diagrams, system diagrams, and flowcharts that relate to techniques for dynamic transmission parameter adaptation.

FIG. 1 illustrates an example of a wireless communications system 100 that supports techniques for dynamic transmission parameter adaptation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for dynamic transmission parameter adaptation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115).

In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A network may consume significant power to operate a cellular network, such as when deploying massive MIMO communications. Network power consumption may be reduced by dynamically adapting transmission parameters at network entities 105 of the wireless communications system. For example, a network entity 105 may adapt, or update, a quantity of antenna ports at an antenna of the network entity 105 or a transmission power for downlink signals and channels. In some cases, the network entity 105 may use a smaller quantity of antenna ports when a resource utilization in a cell (e.g., a cell load) is low (e.g., less than 30% utilized) than when the resource utilization in the cell is high (e.g., higher than 50%). In another example, then network entity 105 may use a lower transmission power when resource utilization is low than when resource utilization is high.

Some systems may support dynamically adapting transmission parameters at a network entity 105 in a short span of time. For example, the network entity 105 may be capable of dynamically adapting transmission parameters in TTI granularity or less. However, such fast transmission parameter adaptation may impact UEs 115 communicating with the network entity 105. For example, fast transmission parameter adaptation in these systems may affect UE implementation, complexity, and performance. For example, fast transmission parameter adaptation may affect a UE time-frequency tracking loop based on synchronization signal blocks (SSBs) or CSI-RS for tracking (e.g., tracking reference signals (TRSs). In some cases, fast transmission parameter adaptation may affect other measurements, such as CSI measurements, radio resource management (RRM) measurements, radio link monitoring (RLM) measurements, and beam measurements. Additionally, the UE 115 may need to know which measurements are to be averaged and when loops are to be reset due to transmission parameter updates.

For example, a UE 115 may receive an indication of a transmission parameter configuration update via a control message, such as a MAC control element or downlink control information. The wireless communications system 100 provides techniques for a parameter switching timeline, such that the UE 115 can identify when the indicated configuration is to be applied, when another new configuration may be indicated, and whether the UE 115 is to have a gap for parameter reconfiguration. The parameter switching timeline may ensure that transmission parameters are unchanged for a certain duration or interval of the timeline to improve network power savings and while maintaining UE performance and implementation complexity.

Figure 2:
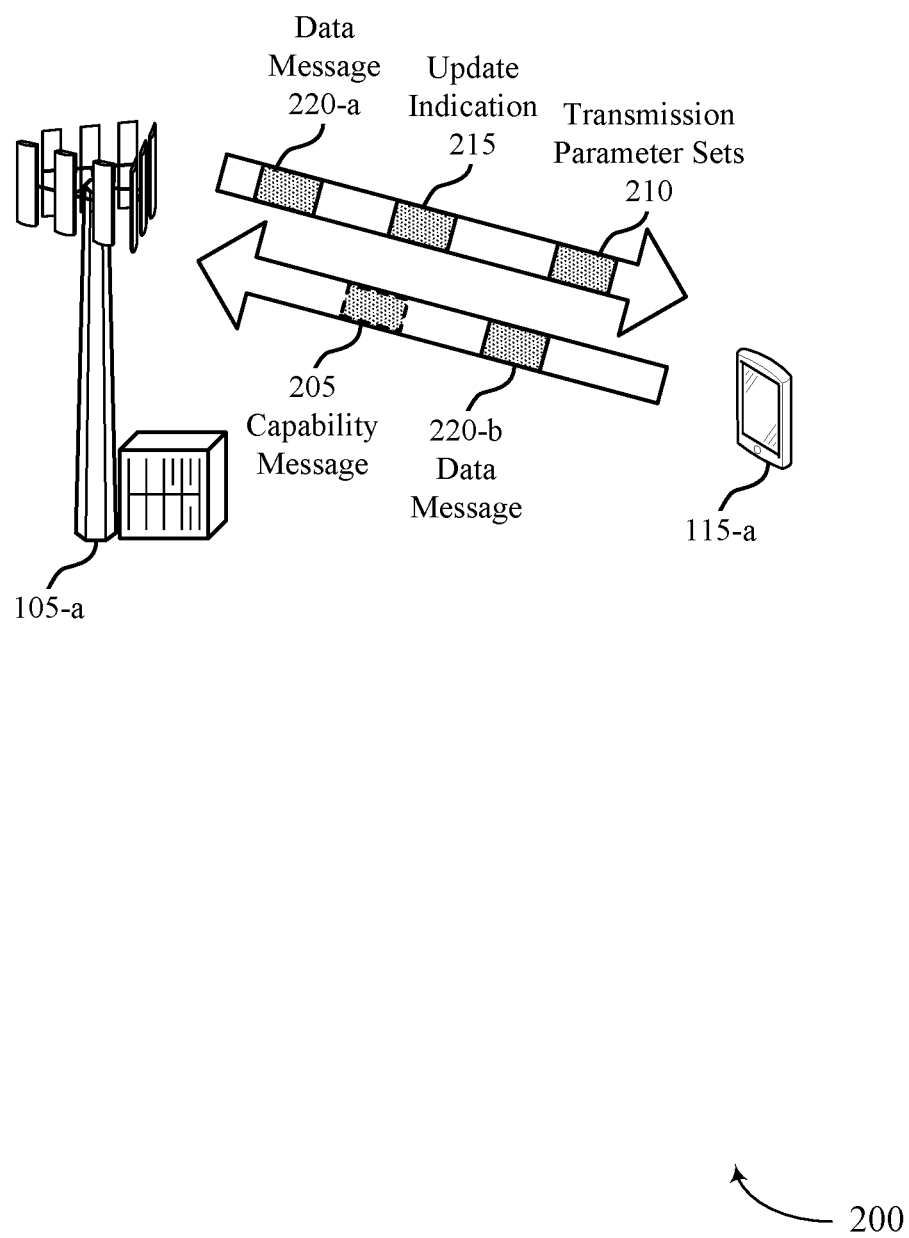
FIG. 2 illustrates an example of a wireless communications system that supports techniques for dynamic transmission parameter adaptation in accordance with one or more aspects of the present disclosure.

FIG. 2 illustrates an example of a wireless communications system 200 that supports techniques for dynamic transmission parameter adaptation in accordance with one or more aspects of the present disclosure. The wireless communications system 200 may include a UE 115-a and a network entity 105-a, which may be respective examples of a UE 115 and a network entity 105 as described with reference to FIG. 1.

The network entity 105-a may support dynamic transmission parameter adaptation to update transmission parameters at the network entity 105-a and reduce network-side power consumption. For example, the network entity 105-a may change a quantity of antenna ports used by the network entity 105-a, or the network entity 105-a may change a transmit power for downlink signaling or downlink channels.

The wireless communications system 200 may support a parameter switching timeline for dynamic transmission parameter adaptation. For example, the UE 115-a may be configured to switch between transmission parameter sets and may switch between the sets in accordance with the parameter switching timeline. The parameter switching timeline may include a set of timers or durations, including a transient time, a parameter reconfiguration gap, and a time to a next transmission parameter indication. The transient time may correspond to a time from receiving an indication of a configuration update to applying the indicated configuration. The parameter reconfiguration gap may correspond to a gap between applying an original configuration and applying an updated configuration, which may provide the UE 115-*a* time to switch between the configurations. The time to the next transmission parameter indication may, for example, be a minimum duration between transmission parameter updates. Additional details and examples of the parameter switching timeline are described in more detail with reference to FIG. 3.

In some examples, the parameter switching timeline may be based on a capability of the UE 115-*a*. For example, the UE 115-*a* may transmit a capability message 205 to the network entity 105-*a*. In some cases, the UE 115-*a* or the network entity 105-*a*, or both, may be configured with multiple parameter switching timelines, and the UE 115-*a* may transmit the capability message 205 indicating which of the multiple parameter switching timelines are supported by the UE 115-*a*. For example, the capability message 205 may indicate support for one or more parameter switching timelines of multiple pre-configured parameter switching timelines.

Additionally, or alternatively, the UE 115-*a* may transmit the capability message 205 indicating values, or a range of values, of the parameters for a parameter switching timeline. For example, the UE 115-*a* may indicate a supported transient time duration, a support parameter reconfiguration gap duration, or a supported time (e.g., a supported minimum time) between parameter update indications, or any combination thereof.

In some examples, the UE 115-*a* may indicate, to the network entity 105-*a*, a capability of the UE 115-*a* to support dynamic transmission parameter adaptation, such as support for dynamic antenna port adaptation or dynamic transmit power adaptation, or both. In examples, the UE 115-*a* may indicate the support for dynamic transmission parameter adaptation via the capability message 205 or separately. In some examples, in supporting the dynamic antenna port adaptation or dynamic transmit power adaptation, the UE 115-*a* may indicate capabilities including at least one or more of the switching timeline parameters. For example, the UE 115-*a* may indicate a supported minimum time to a next transmission parameter (e.g., for antenna port adaptation or transmit power adaptation, or both), a supported parameter reconfiguration gap, a supported transient time, or any combination thereof. The UE capability may be indicated per UE 115, per band, per band combination, per frequency range (e.g., Frequency Range 1, Frequency Range 2, etc.), or any combination thereof. In some examples, the reconfiguration gap may be included with or separate from the transient time. The UE 115-*a* may indicate whether the UE 115-*a* supports the reconfiguration gap being included with or separate from the transient time with the capability message 205.

The network entity 105-*a* may transmit an indication of transmission parameter sets 210 to the UE 115-*a*. For example, the UE 115-*a* may receive control signaling indicating multiple sets of transmission parameters associated with dynamic transmission parameter adaptation. In some examples, the multiple sets of transmission parameters may be switched between in accordance with the dynamic transmission parameter adaptation. For example, a first set of transmission parameters may include a first transmit power or a first quantity of antenna ports, and a second set of transmission parameters may include a second transmit power or a second quantity of antenna ports.

The UE 115-*a* and the network entity 105-*a* may communicate in accordance with a first set of parameters. For example, the network entity 105-*a* may transmit using a first transmit power for downlink signaling to the UE 115-*a*. The network entity 105-*a* may transmit an update indication 215, indicating to switch from communicating with the network entity 105-*a* in accordance with the first set of transmission parameters (e.g., of the multiple sets of transmission parameters) to communicating with the network entity 105-*a* in accordance with a second set of transmission parameters (e.g., of the multiple sets of transmission parameters).

The network entity 105-*a* may transmit control signaling including the update indication 215 to the UE 115-*a*. For example, the network entity 105-*a* may transmit the update indication 215 via a MAC control element or via downlink control information.

The UE 115-*a* may receive the update indication 215 and determine timers and durations of the parameter switching timeline based on the update indication 215. For example, the UE 115-*a* may determine a starting time (e.g., a starting symbol or a starting slot) for a transient time and a time to a next indication update. In some examples, the starting time for the transient time and the time to the next indication update may be based on an end of a last symbol of a configured control resource set in which the UE 115-*a* receives a downlink control channel carrying the indication if the indication is transmitted via downlink control information. In some examples, the starting time for the transient time and the time to the next indication update may be based on a slot where the UE 115-*a* transmits a feedback message (e.g., HARQ acknowledgment feedback) via an uplink control channel (e.g., PUSCH) in response to a downlink shared channel message (e.g., PDSCH) including a MAC control element if the indication is received via the MAC control element. Additionally, or alternatively, the starting time may be indicated explicitly to the UE 115-*a*, such as by being indicated via an RRC message, a MAC control element, or DCI.

In some examples, the UE 115-*a* may communicate in accordance with the first set of transmission parameters during the transient time. During the reconfiguration gap, the UE 115-*a* may switch to the second set of transmission parameters. In some examples, the reconfiguration gap may be included as part of the transient time, or the reconfiguration gap may be after the transient gap. The reconfiguration gap may enable the UE 115-*a* to retune or modify radiofrequency components with respect to the second set of transmission parameters.

After switching from the first set of transmission parameters to the second set of transmission parameters, the UE 115-*a* and the network entity 105-*a* may communicate in accordance with the second set of transmission parameters. For example, the UE 115-*a* may receive a data message 220-*a* from the network entity 105-*a* in accordance with the second set of transmission parameters. For example, the network entity 105-*a* may use the second transmit power to transmit the data message 220-*a* to the UE 115-*a*. In some examples, the UE 115-*a* may transmit a data message 220-*b* to the network entity 105-*a* in accordance with the second set of transmission parameters.

Figure 3:
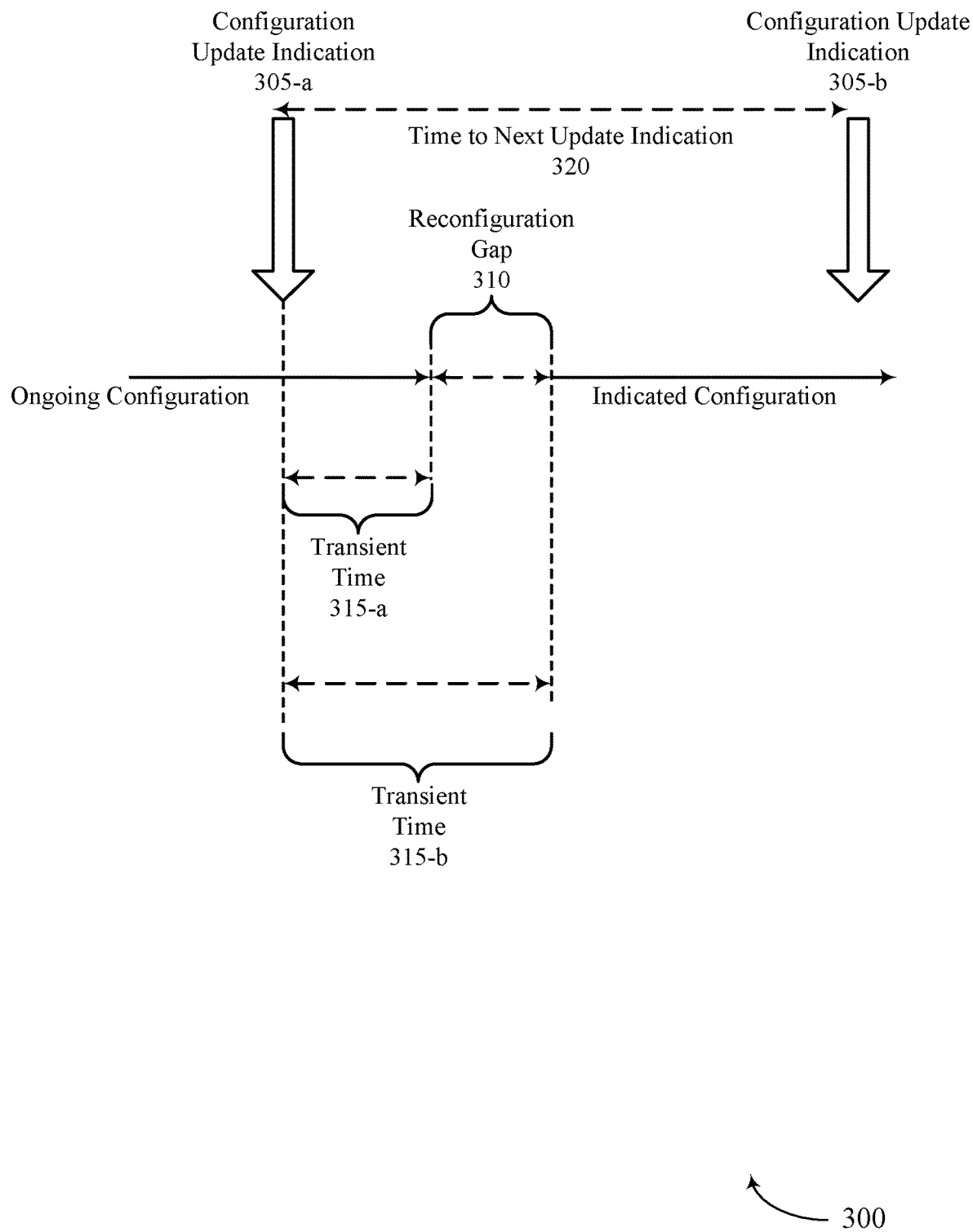
FIG. 3 illustrates an example of a transmission parameter adaptation timeline that supports techniques for dynamic transmission parameter adaptation in accordance with one or more aspects of the present disclosure.

FIG. 3 illustrates an example of a parameter switching timeline 300 that supports techniques for dynamic transmission parameter adaptation in accordance with one or more aspects of the present disclosure. The parameter switching timeline 300 may be implemented by a UE 115 or a network entity 105, or both, as described with reference to FIGS. 1 and 2.

The network entity 105 may support dynamic transmission parameter adaptation to reduce network-side power consumption. The network entity 105 may transmit a configuration update indication 305-*a* to the UE 115, indicating for the UE 115 to switch from communicating in accordance with a first set of transmission parameters to communicating in accordance with a second set of transmission parameters. The UE 115 and the network entity 105 may switch the transmission parameter sets in accordance with the parameter switching timeline 300.

The parameter switching timeline 300 may include, or be based on, a set of timeline parameters. The set of timeline parameters may include a reconfiguration gap 310, a transient time 315, and a time 320 to a next update indication. The reconfiguration gap 310 may be a gap in time (e.g., a length of time, an amount of time, a duration) where the UE 115 retunes one or more radiofrequency components to switch from operating using the first set of parameter to operating using the second set of parameters.

The transient time 315 may correspond to a duration between receiving the configuration update indication 305-*a* and applying the second set of parameters. In some examples, the UE 115 may be configured to communicate in accordance with either the first set of transmission parameters or the second set of transmission parameters during the transient time 315. For example, the UE 115 may apply, or begin communicating in accordance with the second set of transmission parameters, after the transient time 315. Additionally, or alternatively, the UE 115 may refrain form performing some communications (e.g., monitoring for downlink messages or transmitting uplink messages, or both) during the transient time 315.

The time 320 to the next update indication may correspond to a defined (e.g., minimum) time until receiving a next configuration update indication (e.g., a configuration update indication 305-*b*) after receiving the configuration update indication 305-*a*. In some cases, the UE 115 may be indicated the time 320 to the next update indication to reduce monitoring for configuration update indications 305. For example, the UE 115 may begin monitoring for configuration update indications 305 after the time 320 to the next update indication lapses. For example, during times between receiving the configuration update indication 305-*a* and before the time 320 to the next update indication, the UE 115 may not monitor for the configuration update indication 305-*b*, reducing a power consumption at the UE 115.

A starting time of the transient time 315 and a starting time of the time 320 to the next update indication may be based on how the UE 115 receives the configuration update indication 305-*a*. For example, if the configuration update indication 305-*a* is received in downlink control information via a downlink control channel, a starting time for the transient time 315 and the time 320 may be based on a last symbol of a configured control resource set of the downlink control channel. If the configuration update indication 305-*a* is received in a MAC control element (e.g., via a downlink shared channel), a starting time for the transient time 315 and the time 320 may be based on a slot where the UE 115 sends a feedback message in response to the downlink shared channel carrying the MAC control element.

The transient time 315, the reconfiguration gap 310, and the time 320 to the next update indication may be defined or configured with respect to a quantity of symbols, slots, or frames, or any combination thereof. For example, the transient time 315 may be a quantity of symbols, slots, or frames. In some examples, the quantity of TTIs for the durations may be with respect to a first subcarrier spacing of a channel carrying the configuration update indication 305-*a*. For example, the quantity of TTIs may be based on a subcarrier spacing of a physical channel (e.g., a physical downlink control channel, a physical downlink shared channel, an SSB, etc.) transmitted by the network entity 105 to carry the configuration update indication 305-*a*. In some examples, the quantity of TTIs for the durations may be with respect to a subcarrier spacing of a channel configured at the UE 115. In some examples, the quantity of TTIs for the durations may be with respect to a fixed or pre-configured subcarrier spacing, which may be indicated to the UE 115 via control signaling or preconfigured for a wireless communications system including the UE 115.

In some examples, the reconfiguration gap 310 may be included with the transient time 315, or occur after the transient time 315 and before applying the indicated parameters. In a first example, the reconfiguration gap 310 may occur after a transient time 315-*a* and before applying a configuration indicated by the configuration update indication 305-*a*. In a second example, the reconfiguration gap 310 may be included in a transient time 315-*b*. After the reconfiguration gap 310, the UE 115 may communicate with the network entity 105 in accordance with the second set of parameters.

In some cases, the UE 115 may not be scheduled for downlink signaling or uplink signaling, or both, during the reconfiguration gap 310. In some cases, the UE 115 may not expect to be scheduled for downlink signaling or uplink signaling, or both, during the reconfiguration gap 310. If the UE 115 is scheduled or pre-configured for uplink signaling or downlink signaling, or both, during the reconfiguration gap 310, the UE 115 may drop the scheduled signaling.

In some examples, the UE 115 may be scheduled or preconfigured for signaling during the transient time 315. For example, the UE 115 may be scheduled to transmit an uplink message during the transient time 315 or scheduled to receive a downlink message during the transient time 315. In some examples, the UE 115 may perform the scheduled or preconfigured signaling during the transient time 315. For example, the UE 115 may receive the downlink message or transmit the uplink message during the transient time 315. In some examples, the UE 115 may transmit uplink messages scheduled or preconfigured during the transient time 315, but the UE 115 may not monitor for, or may drop, scheduled or preconfigured downlink messages during the transient time. In some examples, the UE 115 may drop uplink messages scheduled or preconfigured during the transient time 315, but the UE 115 may monitor for, or may receive, scheduled or preconfigured downlink messages during the transient time. In some examples, the UE 115 may not perform scheduled or preconfigured signaling during the transient time 315. In some cases, the UE 115 may be preconfigured for signaling during the transient time 315 if the UE 115 is scheduled for slots or symbols overlapping the transient time 315 before receiving the configuration update indication 305-*a*. For example, scheduling may be provided to the UE 115 before the transmission parameter reconfiguration indication is received by the UE 115.

Figure 4:
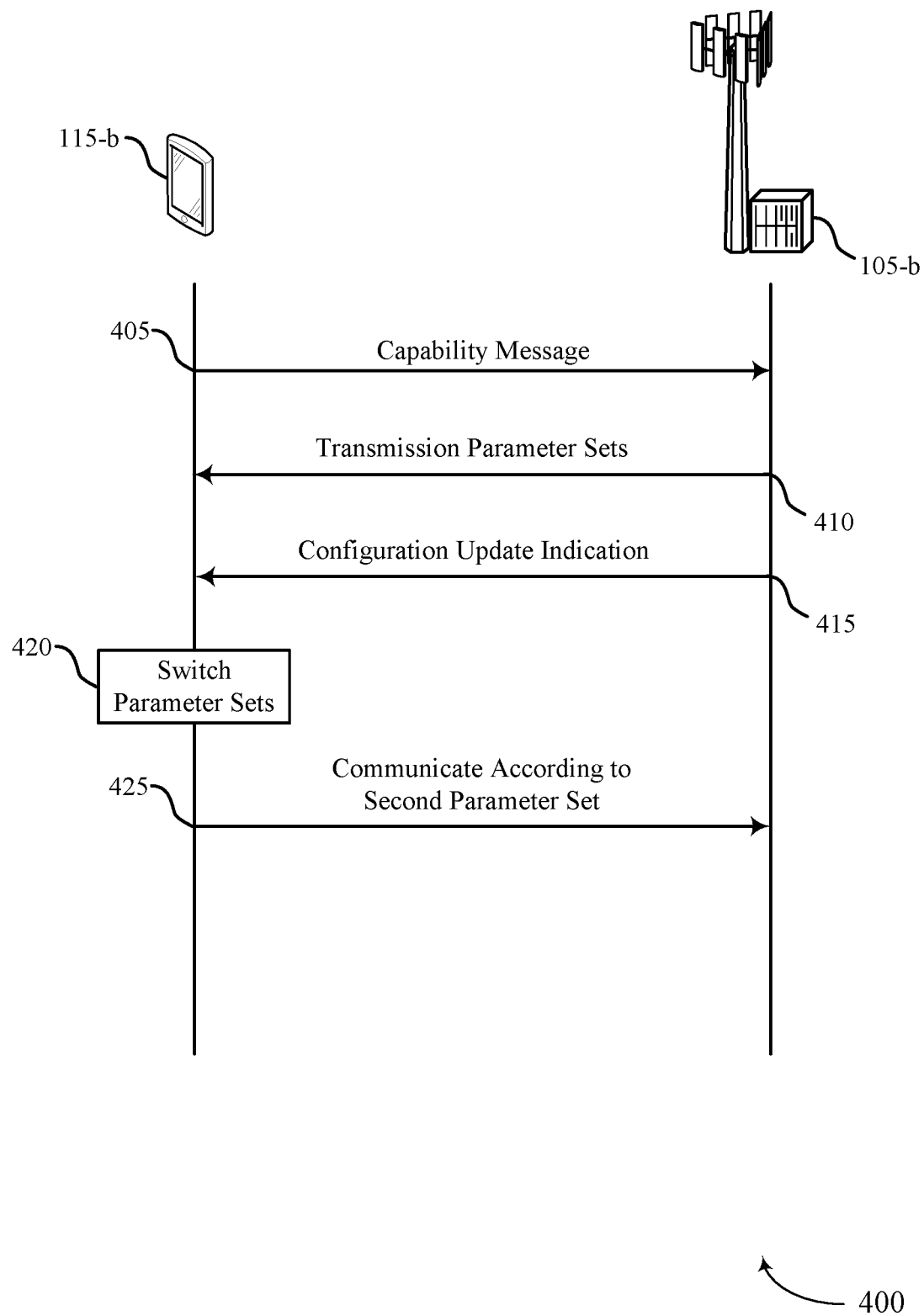
FIG. 4 illustrates an example of a process flow that supports techniques for dynamic transmission parameter adaptation in accordance with one or more aspects of the present disclosure.

FIG. 4 illustrates an example of a process flow 400 that supports techniques for dynamic transmission parameter adaptation in accordance with one or more aspects of the present disclosure. The process flow 400 may be implemented by a UE 115-*b* or a network entity 105-*b*, or both, which may be respective examples of a UE 115 and a network entity 105 as described herein.

In some examples, the UE 115-*b* may transmit a capability message indicating one or more capabilities of the UE 115-*b* at 405. For example, the UE 115-*b* may transmit control signaling indicating a UE capability associated with a parameter switching timeline. Based on the reported UE capability, the network entity 105-*b* and the UE 115-*b* will each identify the parameter switching timeline for dynamic transmission parameter adaptation. For example, the capability message may indicate a parameter switching timeline, or values for parameters of the parameter switching timeline, and the network entity 105-*b* and the UE 115-*b* may perform dynamic transmission parameter adaptation in accordance with the indicated parameter switching timeline or values for the parameters of the parameter switching timeline.

For example, a first time gap for switching between the first set of transmission parameters to the second set of transmission parameters (e.g., a reconfiguration gap), a second time gap between receiving the indication and applying the second set of transmission parameters (e.g., a transient time), and a third time gap between indications to switch sets of transmission parameters (e.g., a supported time between update indications), or any combination thereof may be included in a preconfigured and/or standardized parameter switching timeline. The UE 115-*b* may transmit control signaling indicating whether the UE supports the preconfigured and/or standardized parameter switching timeline. In some cases, the UE 115-*b* may transmit the control signaling indicating a set of supported parameter switching timelines (e.g., from among a plurality of preconfigured and/or standardized parameter switching timelines). Additionally, or alternatively, the UE 115-*b* may transmit the control signaling indicating a parameter switching timeline from a set of parameter switching timelines (e.g., from among a plurality of preconfigured and/or standardized parameter switching timelines). In some cases, the UE 115-*b* may transmit the control signaling indicating parameters of a supported parameter switching timeline. For example, the UE 115-*b* may transmit control signaling indicating a first supported time gap for switching between the first set of transmission parameters to the second set of transmission parameters (e.g., a supported reconfiguration gap), a second supported time gap between receiving the indication and applying the second set of transmission parameters (e.g., a supported transient time), and a third supported time gap between indications to switch sets of transmission parameters (e.g., a supported time between update indications), or any combination thereof. A supported time gap may refer to a length of time, a duration, a minimum time between, a maximum time between, or the like.

At 410, the network entity 105-*b* may transmit, and the UE 115-*b* may receive, a message indicating transmission parameter sets for dynamic transmission parameter adaptation. For example, the UE 115-*b* may receive a first control message indicating multiple sets of transmission parameters associated with dynamic transmission parameter adaptation. For example, a first set of transmission parameters may include a first downlink transmit power or a first quantity of antenna ports used for downlink signaling at the network entity 105-*b*, and a second set of transmission parameters may include a second (e.g., different from the first) downlink transmit power or a second (e.g., different from the first) quantity of antenna ports.

The UE 115-*b* and the network entity 105-*b* may communicate in accordance with a first set of transmission parameters. For example, the network entity 105-*b* may transmit downlink signals or downlink channels to the UE 115-*b* using a first transmit power or using a first quantity of antenna ports. In some cases, to reduce network-side power consumption, the network entity 105-*b* may change or adapt transmit parameters, changing to the second set of transmission parameters.

At 415, the network entity 105-*b* may transmit, and the UE 115-*b* may receive, a configuration update indication to switch from the first set of transmission parameters to the second set of transmission parameters. For example, the UE 115-*b* may receive a second control message including an indication to switch from communicating with the network entity 105-*b* in accordance with a first set of transmission parameters of the multiple sets of transmission parameters to communicating with the network entity 105-*b* in accordance with a second set of transmission parameters of the multiple sets of transmission parameters. In some examples, the UE 115-*b* may receive downlink control information including the indication to switch parameter sets. In some examples, the UE 115-*b* may receive a MAC control element including the indication to switch parameter sets.

In some cases, the UE 115-*b* may average or combine measurements at an end of a period using a first set of transmission parameters. For example, based on receiving the configuration update indication at 415, the UE 115-*b* may begin to average or combine measurements taken while communicating in accordance with the first set of transmission parameters and prior to switching to the second set of transmission parameters. This may provide accurate and reliable measurements for communications in accordance with the first set of transmission parameters without measurements taken while communicating in accordance with the second set of transmission parameters.

At 420, the UE 115-*b* may switch transmission parameter sets. For example, the UE 115-*b* may switch from the first set of transmission parameters to the second set of transmission parameters in accordance with a parameter switching timeline. The parameter switching timeline may include a first time gap for switching between the first set of transmission parameters to the second set of transmission parameters (e.g., the reconfiguration gap), a second time gap between receiving the configuration update indication and applying the second set of transmission parameters (e.g., the transient time or transition time), and a third time gap between indications to switch sets of transmission parameters.

During the first time gap (e.g., the reconfiguration gap), the UE 115-*b* may modify a configuration at the UE 115-*b* to communicate in accordance with the second set of transmission parameters. For example, the UE 115-*b* may retune radiofrequency components of the UE 115-*b* to receive downlink signaling in accordance with the second set of transmission parameters.

During the second time gap (e.g., the transient time), the UE 115-*b* may (e.g., may be configured to) communicate or drop scheduled signaling. For example, the UE 115-*b* may have received the configuration update indication and have identified the second set of transmission parameters, but the UE 115-*b* may, or may not, apply the second set of transmission parameters for communications with the network entity 105-*b*. In some examples, the UE 115-*b* may perform scheduled or preconfigured uplink or downlink signaling during the second time gap. In some examples, the UE 115-*b* may perform scheduled or preconfigured uplink signaling but may not perform scheduled or preconfigured downlink signaling, or vice versa. In some examples, the UE 115-*b* may not perform (e.g., may drop) scheduled or preconfigured uplink or downlink signaling during the second time gap. In some cases, the UE 115-*b* may perform the scheduled signaling in accordance with the first set of transmission parameters. In some other examples, the UE 115-*b* may perform the scheduled or preconfigured signaling in accordance with the second set of transmission parameters.

At 425, the UE 115-*b* and the network entity 105-*b* may communicate in accordance with the second set of transmission parameters. For example, the UE 115-*b* and the network entity 105-*b* may communicate one or more messages based on a switch, in response to the second control message, from the first set of transmission parameters to the second set of transmission parameters in accordance with the parameter switching timeline for the dynamic transmission parameter adaptation. For example, the network entity 105-*b* may transmit downlink signaling or downlink channels to the UE 115-*b* using the second transmit power or using the second quantity of antenna ports.

Figure 5:
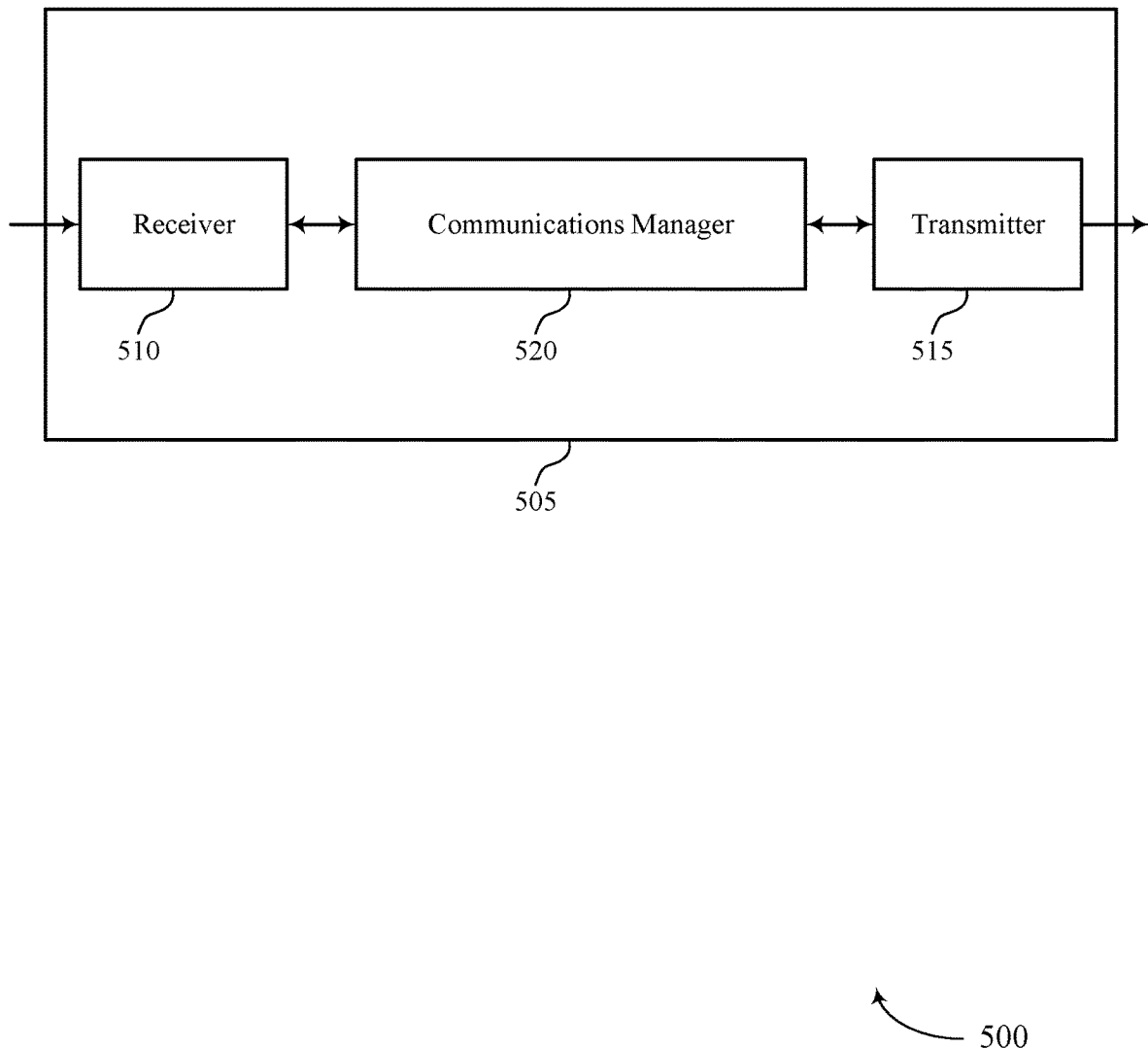
FIGS. 5 and 6 show block diagrams of devices that support techniques for dynamic transmission parameter adaptation in accordance with one or more aspects of the present disclosure.

FIG. 5 shows a block diagram 500 of a device 505 that supports techniques for dynamic transmission parameter adaptation in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for dynamic transmission parameter adaptation). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for dynamic transmission parameter adaptation). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for dynamic transmission parameter adaptation as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 may be configured as or otherwise support a means for receiving, from a network entity, a first control message indicating a set of multiple sets of transmission parameters associated with dynamic transmission parameter adaptation. The communications manager 520 may be configured as or otherwise support a means for receiving a second control message including an indication to switch from communicating with the network entity in accordance with a first set of transmission parameters of the multiple sets of transmission parameters to communicating with the network entity in accordance with a second set of transmission parameters of the multiple sets of transmission parameters. The communications manager 520 may be configured as or otherwise support a means for communicating one or more messages with the network entity based on a switch, in response to the second control message, from the first set of transmission parameters to the second set of transmission parameters in accordance with a parameter switching timeline for the dynamic transmission parameter adaptation.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reducing complexity at a UE 115 while reducing network-side power consumption. For example, by implanting a parameter switching timeline, the UE 115 may support dynamically switching between sets of transmission parameters for dynamic transmission parameter adaptation while ensuring the UE 115 has sufficient time to retune radiofrequency components. Additionally, the parameter switching timeline may maintain time-frequency tracking loops at the UE 115 while changing network-side transmission parameters, which may maintain mobility management, RRM, RLM, and channel estimation performance.

Figure 6:
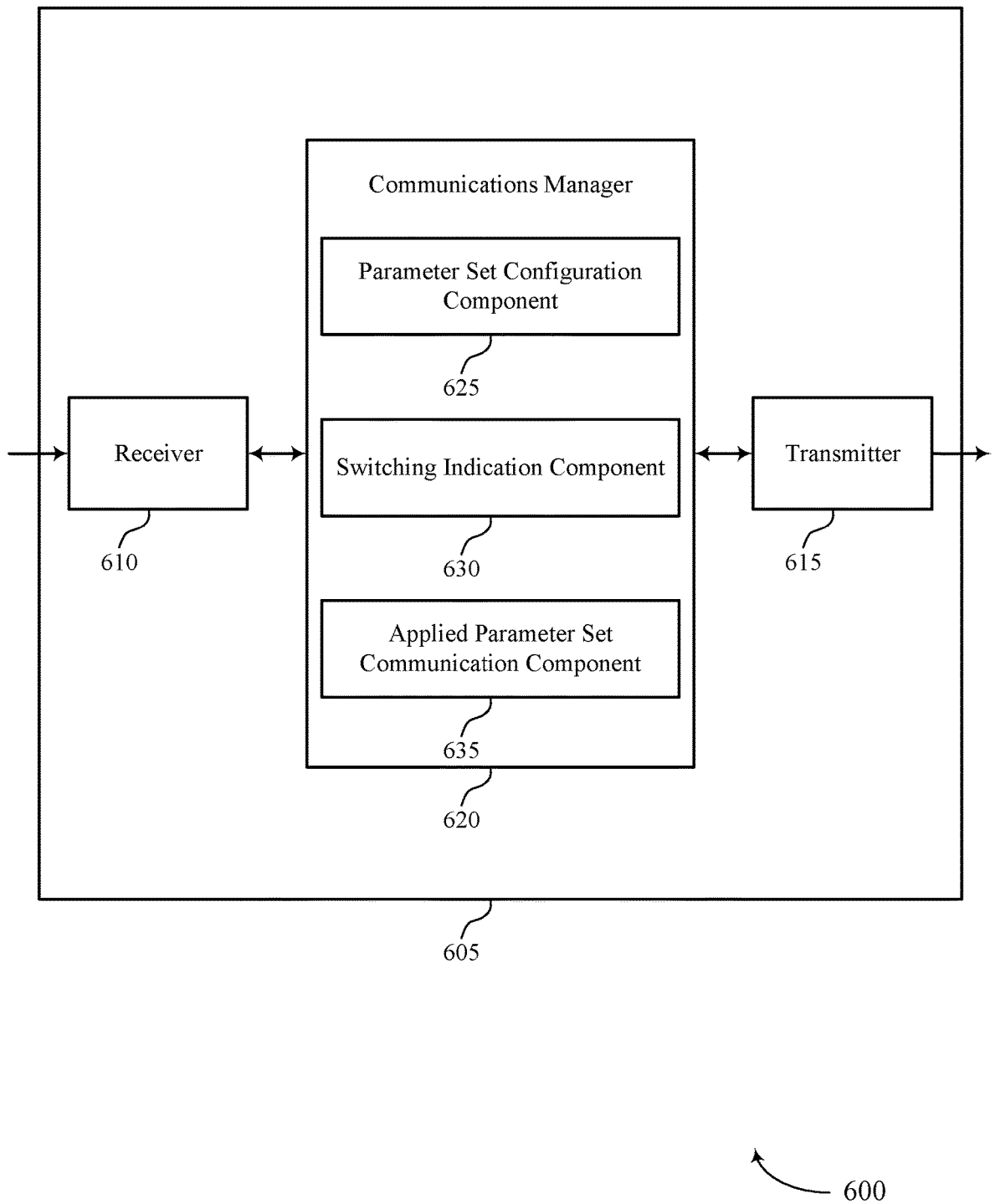

FIG. 6 shows a block diagram 600 of a device 605 that supports techniques for dynamic transmission parameter adaptation in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for dynamic transmission parameter adaptation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for dynamic transmission parameter adaptation). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for dynamic transmission parameter adaptation as described herein. For example, the communications manager 620 may include a parameter set configuration component 625, a switching indication component 630, an applied parameter set communication component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The parameter set configuration component 625 may be configured as or otherwise support a means for receiving, from a network entity, a first control message indicating a set of multiple sets of transmission parameters associated with dynamic transmission parameter adaptation. The switching indication component 630 may be configured as or otherwise support a means for receiving a second control message including an indication to switch from communicating with the network entity in accordance with a first set of transmission parameters of the multiple sets of transmission parameters to communicating with the network entity in accordance with a second set of transmission parameters of the multiple sets of transmission parameters. The applied parameter set communication component 635 may be configured as or otherwise support a means for communicating one or more messages with the network entity based on a switch, in response to the second control message, from the first set of transmission parameters to the second set of transmission parameters in accordance with a parameter switching timeline for the dynamic transmission parameter adaptation.

Figure 7:
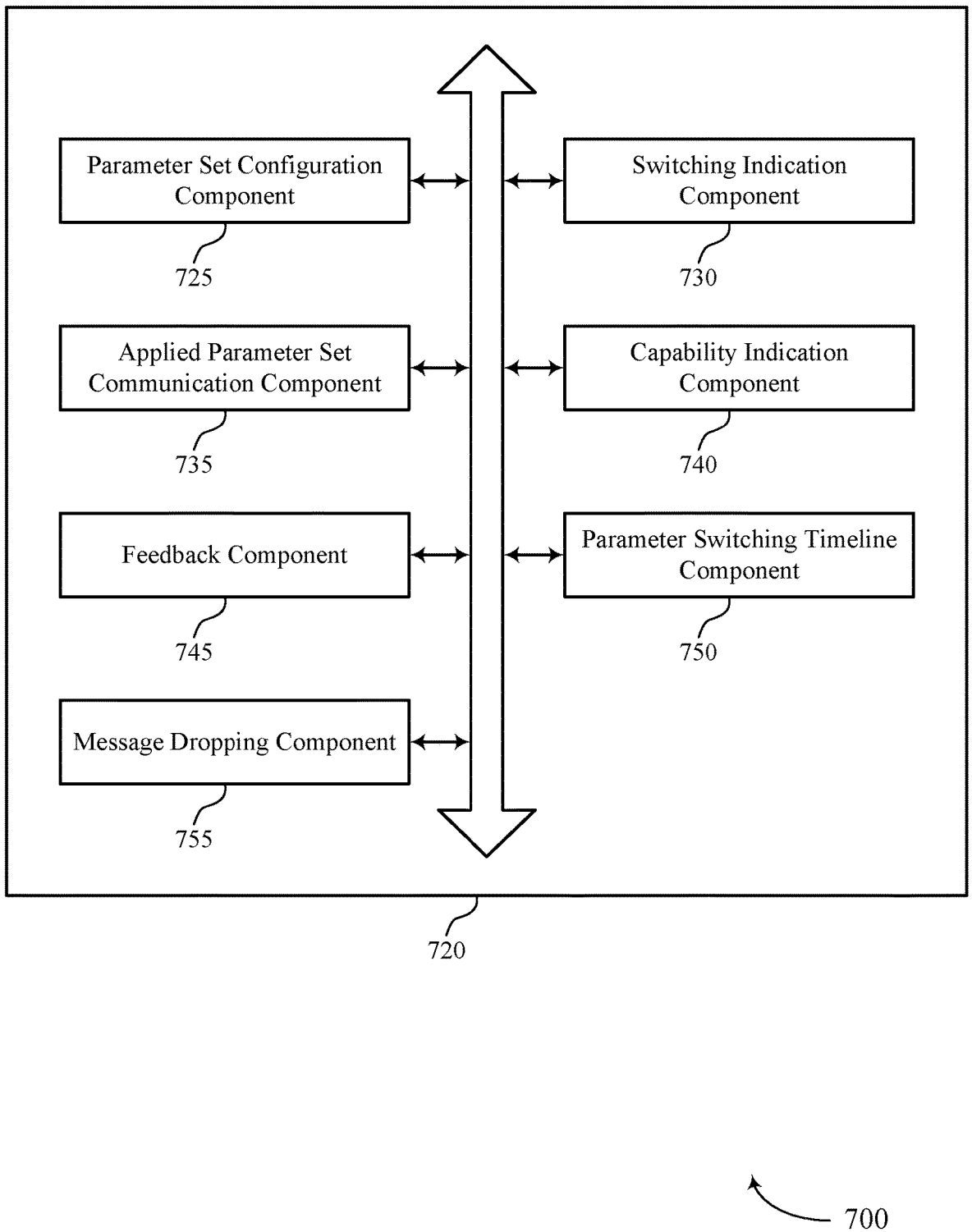
FIG. 7 shows a block diagram of a communications manager that supports techniques for dynamic transmission parameter adaptation in accordance with one or more aspects of the present disclosure.

FIG. 7 shows a block diagram 700 of a communications manager 720 that supports techniques for dynamic transmission parameter adaptation in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for dynamic transmission parameter adaptation as described herein. For example, the communications manager 720 may include a parameter set configuration component 725, a switching indication component 730, an applied parameter set communication component 735, a capability indication component 740, a feedback component 745, a parameter switching timeline component 750, a message dropping component 755, or any combination thereof. Each of these components may communicate, directly or indirectly, with one another (e.g., via one or more buses).

The communications manager 720 may support wireless communications at a UE in accordance with examples as disclosed herein. The parameter set configuration component 725 may be configured as or otherwise support a means for receiving, from a network entity, a first control message indicating a set of multiple sets of transmission parameters associated with dynamic transmission parameter adaptation. The switching indication component 730 may be configured as or otherwise support a means for receiving a second control message including an indication to switch from communicating with the network entity in accordance with a first set of transmission parameters of the multiple sets of transmission parameters to communicating with the network entity in accordance with a second set of transmission parameters of the multiple sets of transmission parameters. The applied parameter set communication component 735 may be configured as or otherwise support a means for communicating one or more messages with the network entity based on a switch, in response to the second control message, from the first set of transmission parameters to the second set of transmission parameters in accordance with a parameter switching timeline for the dynamic transmission parameter adaptation.

In some examples, the parameter switching timeline includes a first time gap for switching between the first set of transmission parameters to the second set of transmission parameters, a second time gap between receiving the indication and applying the second set of transmission parameters, and a third time gap between indications to switch sets of transmission parameters.

In some examples, the capability indication component 740 may be configured as or otherwise support a means for transmitting control signaling indicating a UE capability associated with the parameter switching timeline.

In some examples, to support transmitting the control signaling, the capability indication component 740 may be configured as or otherwise support a means for transmitting the control signaling indicating a set of multiple supported parameter switching timelines including at least the parameter switching timeline.

In some examples, to support transmitting the control signaling, the capability indication component 740 may be configured as or otherwise support a means for transmitting the control signaling indicating the parameter switching timeline from a set of multiple parameter switching timelines.

In some examples, to support transmitting the control signaling, the capability indication component 740 may be configured as or otherwise support a means for transmitting the control signaling indicating a first supported time gap for switching between the first set of transmission parameters to the second set of transmission parameters, a second supported time gap between receiving the indication and applying the second set of transmission parameters, and a third supported time gap between indications to switch sets of transmission parameters, or any combination thereof.

In some examples, to support receiving the second control message, the switching indication component 730 may be configured as or otherwise support a means for receiving a downlink control information message including a first indication to switch from the first set of transmission parameters to the second set of transmission parameters, where a timer associated with the switch begins from a last symbol of a control resource set used to transmit the downlink control information message.

In some examples, to support receiving the second control message, the switching indication component 730 may be configured as or otherwise support a means for receiving a medium access control message including a first indication to switch from the first set of transmission parameters to the second set of transmission parameters. In some examples, to support receiving the second control message, the feedback component 745 may be configured as or otherwise support a means for transmitting a feedback message in response to the medium access control message, where a timer associated with the switch begins from a slot used to transmit the feedback message.

In some examples, the parameter switching timeline component 750 may be configured as or otherwise support a means for receiving control signaling indicating that a timer duration, associated with the switch, begins from a last symbol of a control resource set used to transmit the control signaling.

In some examples, the parameter switching timeline is based on a subcarrier spacing of a physical channel carrying the indication.

In some examples, the parameter switching timeline component 750 may be configured as or otherwise support a means for receiving control signaling indicating a subcarrier spacing associated with the parameter switching timeline.

In some examples, the parameter switching timeline is based on a first time gap for switching between the first set of transmission parameters to the second set of transmission parameters, a second time gap between receiving the indication and applying the second set of transmission parameters, and a third time gap between indications to switch sets of transmission parameters, or any combination thereof.

In some examples, the first time gap, the second time gap, or the third time gap, or any combination thereof, correspond to a quantity of symbols, slots, or frames, or any combination thereof.

In some examples, the message dropping component 755 may be configured as or otherwise support a means for dropping a scheduled communication during a time gap after switching to the second set of transmission parameters and before communicating in accordance with the second set of transmission parameters.

In some examples, the applied parameter set communication component 735 may be configured as or otherwise support a means for transmitting a scheduled message after receiving the second control message and before switching to the second set of transmission parameters in accordance with the first set of transmission parameters and the parameter switching timeline.

In some examples, the applied parameter set communication component 735 may be configured as or otherwise support a means for receiving a scheduled message after receiving the second control message and before switching to the second set of transmission parameters in accordance with the first set of transmission parameters and the parameter switching timeline.

In some examples, the message dropping component 755 may be configured as or otherwise support a means for dropping a scheduled communication after receiving the second control message and before switching to the second set of transmission parameters in accordance with the parameter switching timeline.

Figure 8:
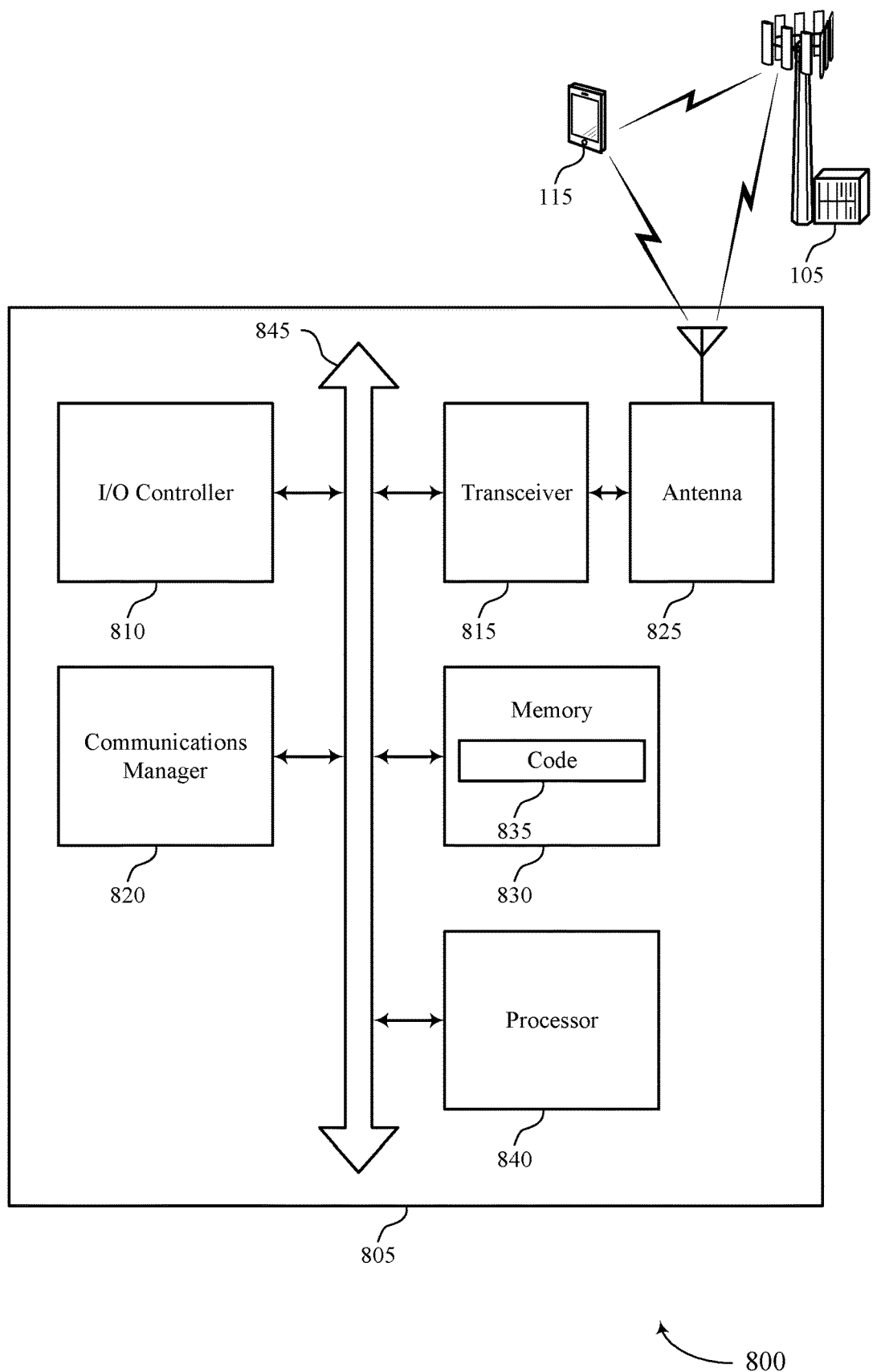
FIG. 8 shows a diagram of a system including a device that supports techniques for dynamic transmission parameter adaptation in accordance with one or more aspects of the present disclosure.

FIG. 8 shows a diagram of a system 800 including a device 805 that supports techniques for dynamic transmission parameter adaptation in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for dynamic transmission parameter adaptation). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a network entity, a first control message indicating a set of multiple sets of transmission parameters associated with dynamic transmission parameter adaptation. The communications manager 820 may be configured as or otherwise support a means for receiving a second control message including an indication to switch from communicating with the network entity in accordance with a first set of transmission parameters of the multiple sets of transmission parameters to communicating with the network entity in accordance with a second set of transmission parameters of the multiple sets of transmission parameters. The communications manager 820 may be configured as or otherwise support a means for communicating one or more messages with the network entity based on a switch, in response to the second control message, from the first set of transmission parameters to the second set of transmission parameters in accordance with a parameter switching timeline for the dynamic transmission parameter adaptation.

By including or configuring the communications manager 820 in accordance with examples as described herein, the device 805 may support techniques for reducing complexity at a UE 115 while reducing network-side power consumption. For example, by implanting a parameter switching timeline, the UE 115 may support dynamically switching between sets of transmission parameters for dynamic transmission parameter adaptation while ensuring the UE 115 has sufficient time to retune radiofrequency components. Additionally, the parameter switching timeline may maintain time-frequency tracking loops at the UE 115 while changing network-side transmission parameters, which may maintain mobility management, RRM, RLM, and channel estimation performance.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for dynamic transmission parameter adaptation as described herein, or the processor 840 and the memory 830 may be otherwise configured to perform or support such operations.

Figure 9:
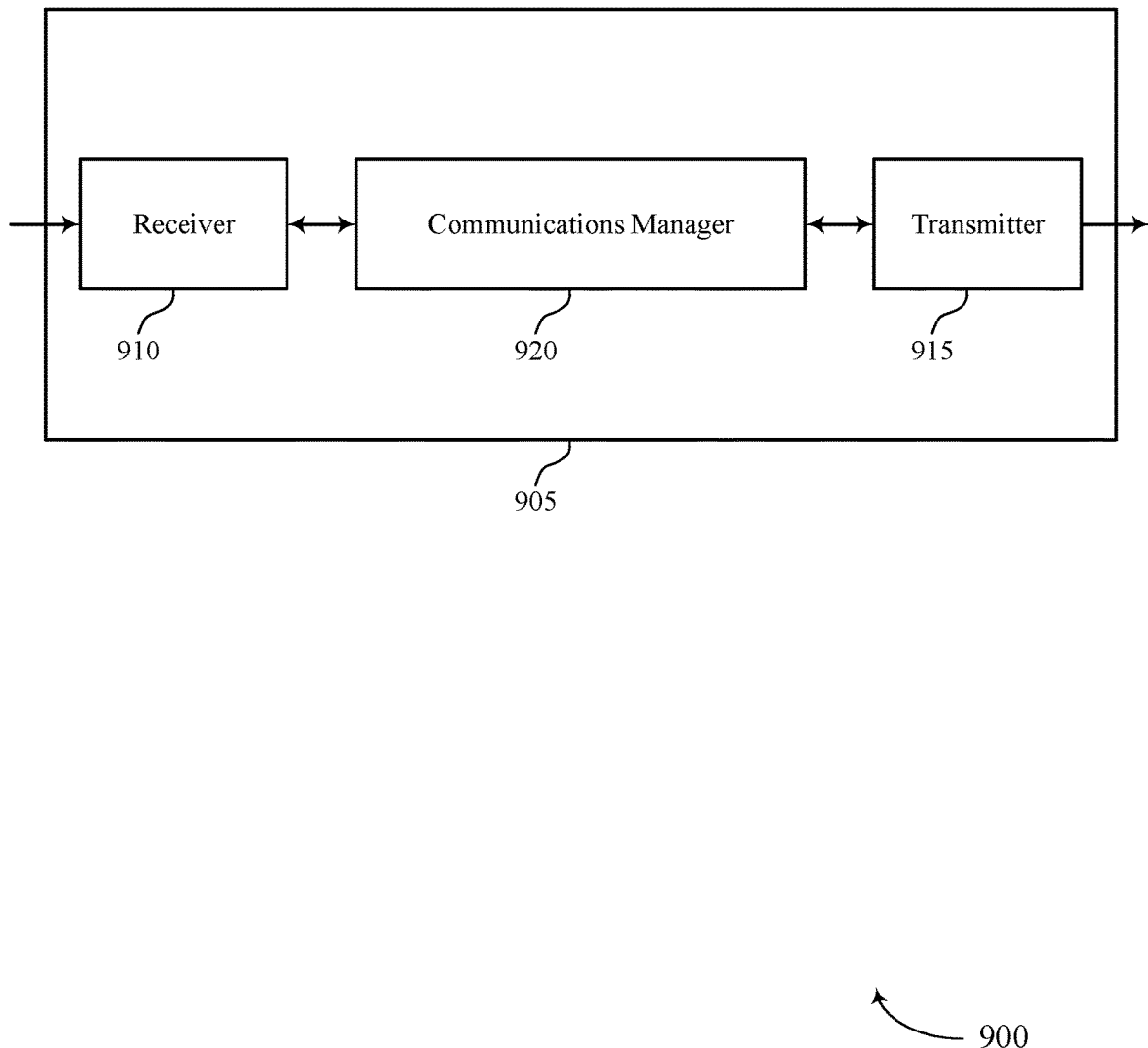
FIGS. 9 and 10 show block diagrams of devices that support techniques for dynamic transmission parameter adaptation in accordance with one or more aspects of the present disclosure.

FIG. 9 shows a block diagram 900 of a device 905 that supports techniques for dynamic transmission parameter adaptation in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of techniques for dynamic transmission parameter adaptation as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 may be configured as or otherwise support a means for transmitting, to a UE, a first control message indicating a set of multiple sets of transmission parameters associated with dynamic transmission parameter adaptation. The communications manager 920 may be configured as or otherwise support a means for transmitting a second control message including an indication to switch from communicating with the network entity in accordance with a first set of transmission parameters of the multiple sets of transmission parameters to communicating in accordance with a second set of transmission parameters of the multiple sets of transmission parameters. The communications manager 920 may be configured as or otherwise support a means for communicating one or more message with the network entity based on a switch, in response to the second control message, from the first set of transmission parameters to the second set of transmission parameters in accordance with a parameter switching timeline for the dynamic transmission parameter adaptation.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reducing network-side power consumption without significantly increasing UE complexity. For example, by supporting a parameter switching timeline, a network entity 105 may support dynamic transmission parameter adaptation to switch between power-efficient parameter sets without significantly increasing UE complexity or affecting UE mobility management or channel quality management.

Figure 10:
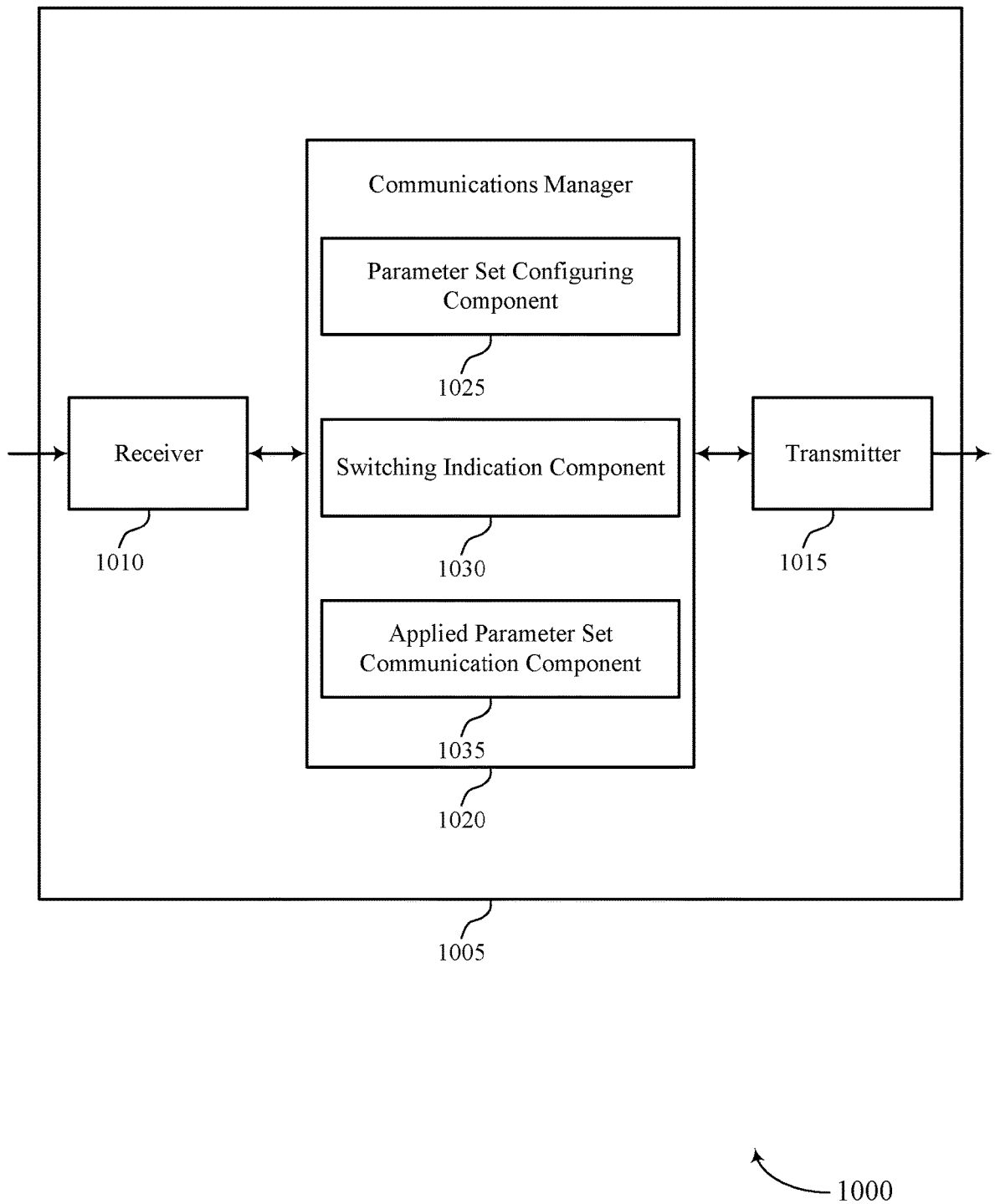

FIG. 10 shows a block diagram 1000 of a device 1005 that supports techniques for dynamic transmission parameter adaptation in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of techniques for dynamic transmission parameter adaptation as described herein. For example, the communications manager 1020 may include a parameter set configuring component 1025, a switching indication component 1030, an applied parameter set communication component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The parameter set configuring component 1025 may be configured as or otherwise support a means for transmitting, to a UE, a first control message indicating a set of multiple sets of transmission parameters associated with dynamic transmission parameter adaptation. The switching indication component 1030 may be configured as or otherwise support a means for transmitting a second control message including an indication to switch from communicating with the network entity in accordance with a first set of transmission parameters of the multiple sets of transmission parameters to communicating in accordance with a second set of transmission parameters of the multiple sets of transmission parameters. The applied parameter set communication component 1035 may be configured as or otherwise support a means for communicating one or more message with the network entity based on a switch, in response to the second control message, from the first set of transmission parameters to the second set of transmission parameters in accordance with a parameter switching timeline for the dynamic transmission parameter adaptation.

Figure 11:
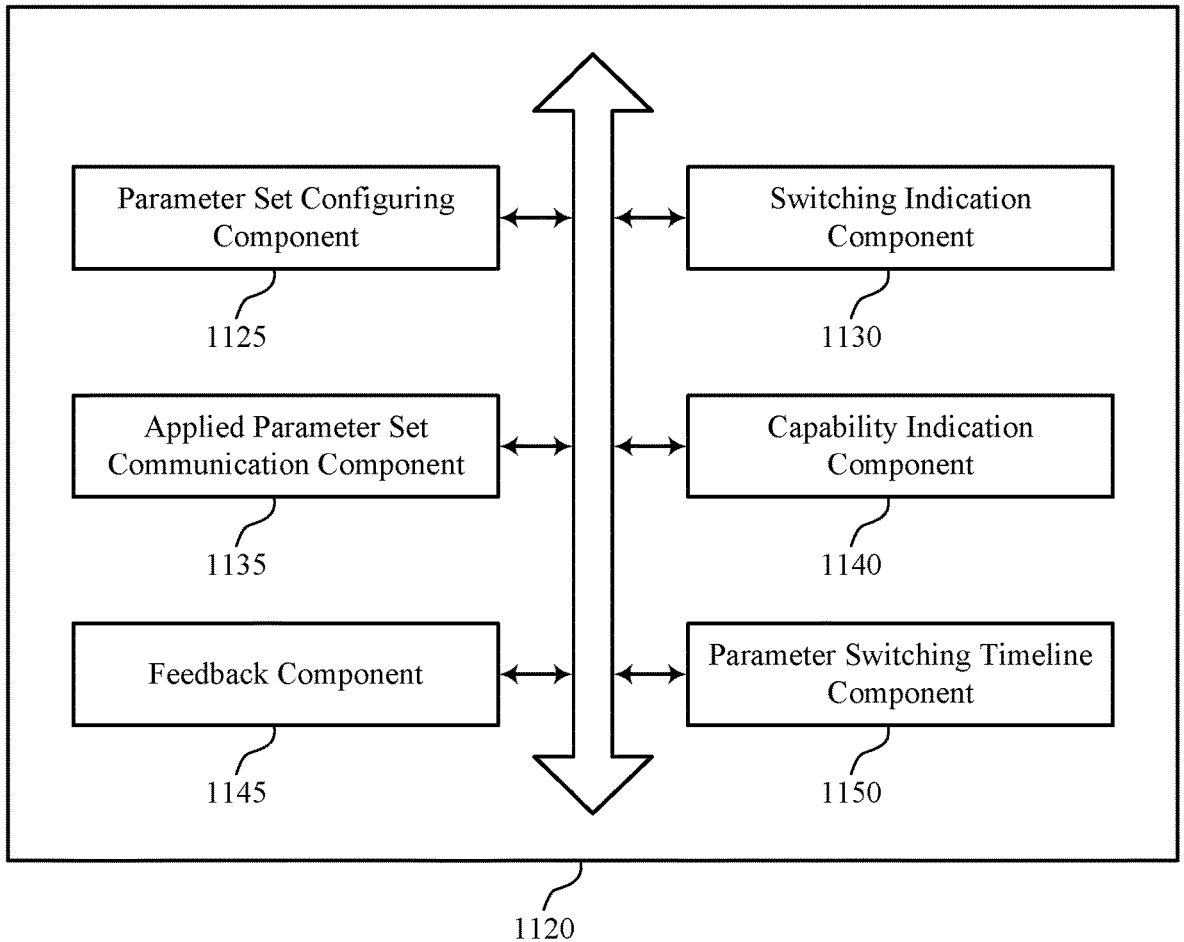
FIG. 11 shows a block diagram of a communications manager that supports techniques for dynamic transmission parameter adaptation in accordance with one or more aspects of the present disclosure.

FIG. 11 shows a block diagram 1100 of a communications manager 1120 that supports techniques for dynamic transmission parameter adaptation in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for dynamic transmission parameter adaptation as described herein. For example, the communications manager 1120 may include a parameter set configuring component 1125, a switching indication component 1130, an applied parameter set communication component 1135, a capability indication component 1140, a feedback component 1145, a parameter switching timeline component 1150, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The parameter set configuring component 1125 may be configured as or otherwise support a means for transmitting, to a UE, a first control message indicating a set of multiple sets of transmission parameters associated with dynamic transmission parameter adaptation. The switching indication component 1130 may be configured as or otherwise support a means for transmitting a second control message including an indication to switch from communicating with the network entity in accordance with a first set of transmission parameters of the multiple sets of transmission parameters to communicating in accordance with a second set of transmission parameters of the multiple sets of transmission parameters. The applied parameter set communication component 1135 may be configured as or otherwise support a means for communicating one or more message with the network entity based on a switch, in response to the second control message, from the first set of transmission parameters to the second set of transmission parameters in accordance with a parameter switching timeline for the dynamic transmission parameter adaptation.

In some examples, the capability indication component 1140 may be configured as or otherwise support a means for receiving control signaling indicating a UE capability associated with the parameter switching timeline.

In some examples, to support receiving the control signaling, the capability indication component 1140 may be configured as or otherwise support a means for receiving the control signaling indicating a set of multiple supported parameter switching timelines including at least the parameter switching timeline.

In some examples, to support receiving the control signaling, the capability indication component 1140 may be configured as or otherwise support a means for receiving the control signaling indicating the parameter switching timeline from a set of multiple parameter switching timelines.

In some examples, to support receiving the control signaling, the capability indication component 1140 may be configured as or otherwise support a means for receiving the control signaling indicating a first supported time gap for switching between the first set of transmission parameters to the second set of transmission parameters, a second supported time gap between receiving the indication and applying the second set of transmission parameters, and a third supported time gap between indications to switch sets of transmission parameters, or any combination thereof.

In some examples, to support transmitting the second control message, the switching indication component 1130 may be configured as or otherwise support a means for transmitting a downlink control information message including a first indication to switch from the first set of transmission parameters to the second set of transmission parameters, where a timer associated with the switch begins from a last symbol of a control resource set used to transmit the downlink control information message.

In some examples, to support transmitting the second control message, the switching indication component 1130 may be configured as or otherwise support a means for transmitting a medium access control message including a first indication to switch from the first set of transmission parameters to the second set of transmission parameters. In some examples, to support transmitting the second control message, the feedback component 1145 may be configured as or otherwise support a means for receiving a feedback message in response to the medium access control message, where a timer associated with the switch begins from a slot used to transmit the feedback message.

In some examples, the parameter switching timeline component 1150 may be configured as or otherwise support a means for transmitting control signaling indicating that a timer duration, associated with the switch, begins from a last symbol of a control resource set used to transmit the control signaling.

In some examples, the parameter switching timeline component 1150 may be configured as or otherwise support a means for transmitting control signaling indicating a subcarrier spacing associated with the parameter switching timeline.

In some examples, the applied parameter set communication component 1135 may be configured as or otherwise support a means for receiving a scheduled message after receiving the second control message and before switching to the first set of transmission parameters in accordance with the first set of transmission parameters and the parameter switching timeline.

In some examples, the applied parameter set communication component 1135 may be configured as or otherwise support a means for transmitting a scheduled message after receiving the second control message and before switching to the first set of transmission parameters in accordance with the first set of transmission parameters and the parameter switching timeline.

Figure 12:
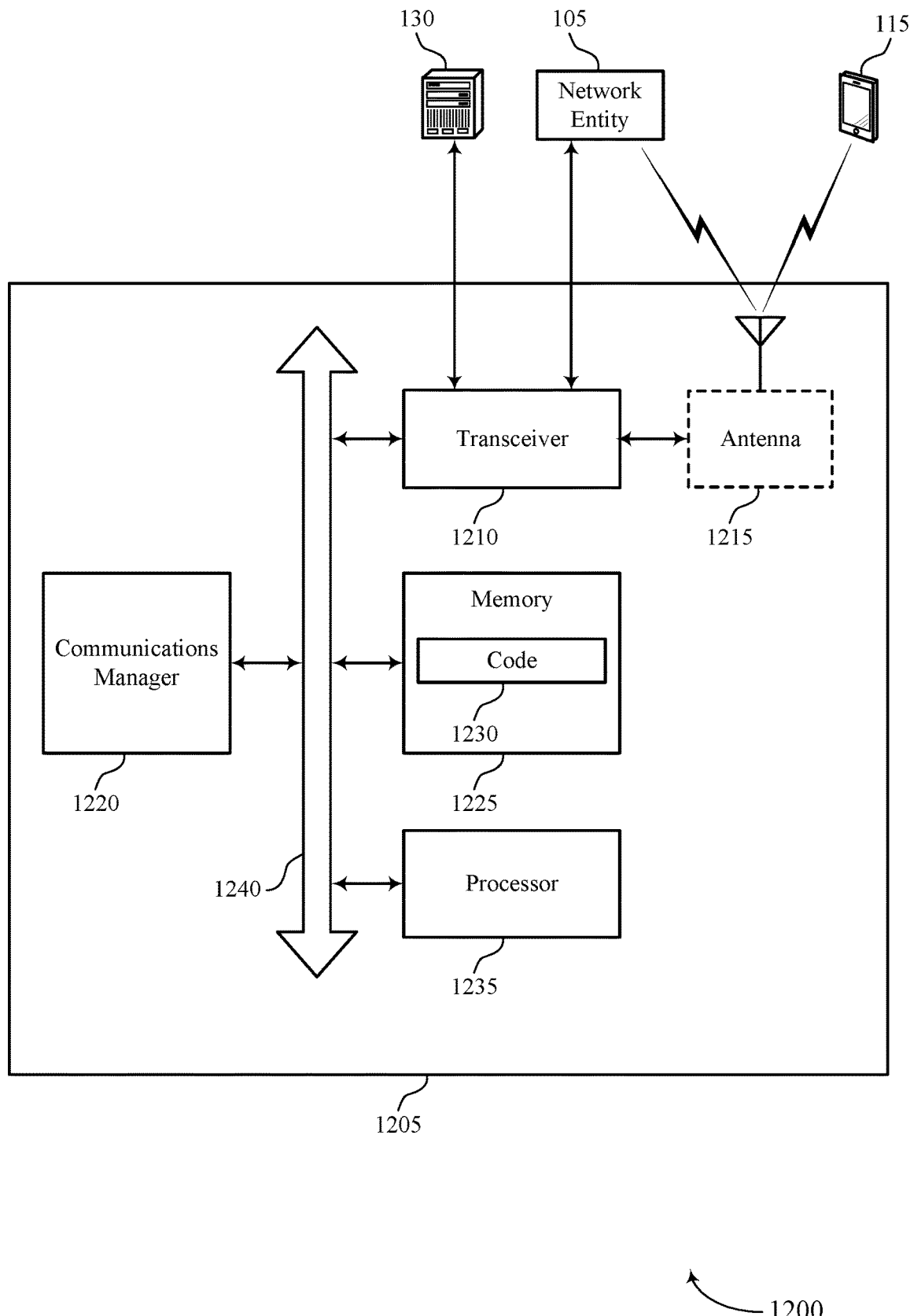
FIG. 12 shows a diagram of a system including a device that supports techniques for dynamic transmission parameter adaptation in accordance with one or more aspects of the present disclosure.

FIG. 12 shows a diagram of a system 1200 including a device 1205 that supports techniques for dynamic transmission parameter adaptation in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting techniques for dynamic transmission parameter adaptation). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 may be configured as or otherwise support a means for transmitting, to a UE, a first control message indicating a set of multiple sets of transmission parameters associated with dynamic transmission parameter adaptation. The communications manager 1220 may be configured as or otherwise support a means for transmitting a second control message including an indication to switch from communicating with the network entity in accordance with a first set of transmission parameters of the multiple sets of transmission parameters to communicating in accordance with a second set of transmission parameters of the multiple sets of transmission parameters. The communications manager 1220 may be configured as or otherwise support a means for communicating one or more message with the network entity based on a switch, in response to the second control message, from the first set of transmission parameters to the second set of transmission parameters in accordance with a parameter switching timeline for the dynamic transmission parameter adaptation.

By including or configuring the communications manager 1220 in accordance with examples as described herein, the device 1205 may support techniques for reducing network-side power consumption without significantly increasing UE complexity. For example, by supporting a parameter switching timeline, a network entity 105 may support dynamic transmission parameter adaptation to switch between power-efficient parameter sets without significantly increasing UE complexity or affecting UE mobility management or channel quality management.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of techniques for dynamic transmission parameter adaptation as described herein, or the processor 1235 and the memory 1225 may be otherwise configured to perform or support such operations.

Figure 13:
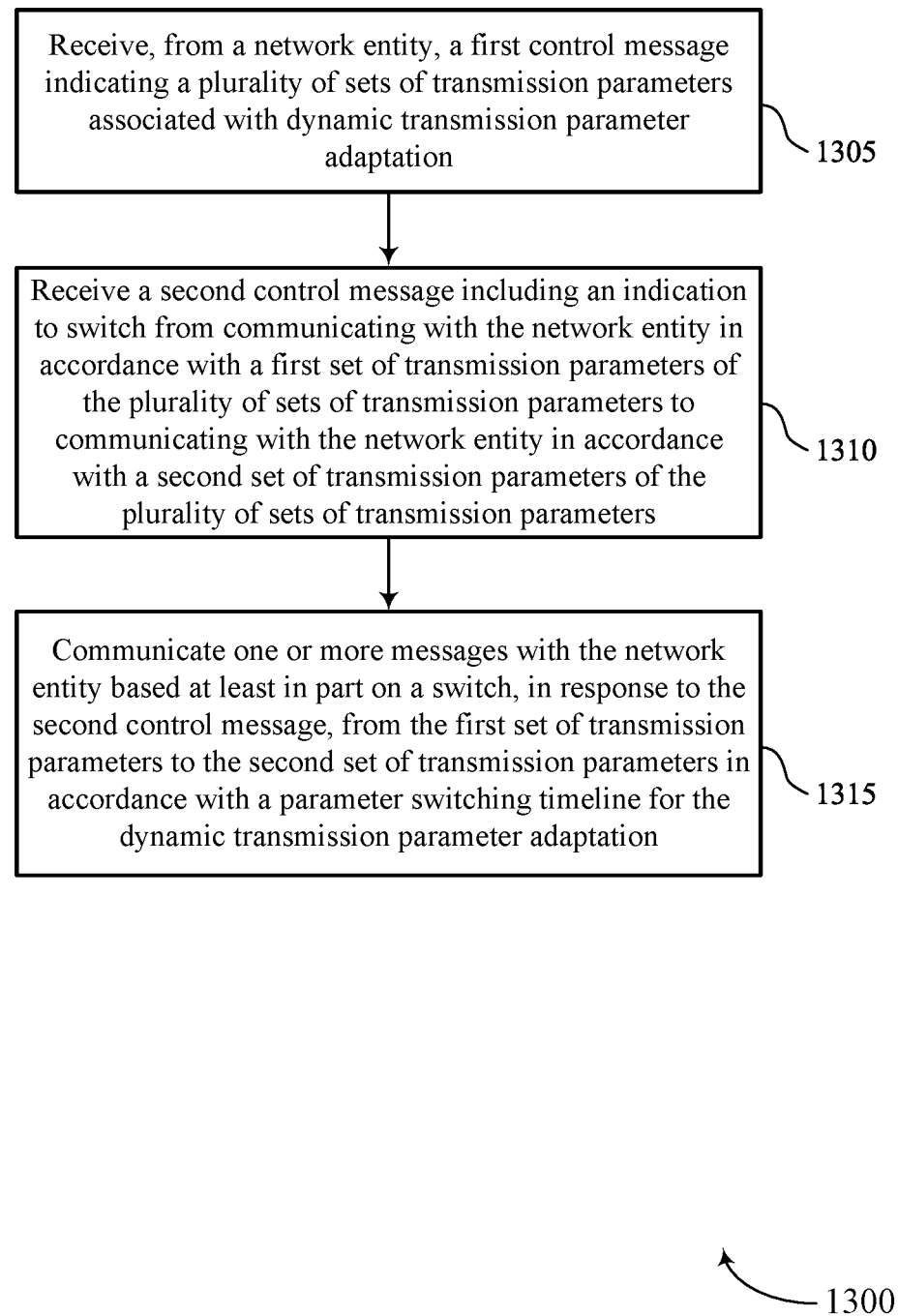
FIGS. 13 through 15 show flowcharts illustrating methods that support techniques for dynamic transmission parameter adaptation in accordance with one or more aspects of the present disclosure.

FIG. 13 shows a flowchart illustrating a method 1300 that supports techniques for dynamic transmission parameter adaptation in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving, from a network entity, a first control message indicating a set of multiple sets of transmission parameters associated with dynamic transmission parameter adaptation. The operations of 1305 may be performed in accordance with examples as disclosed herein. In some examples, aspects of the operations of 1305 may be performed by a parameter set configuration component 725 as described with reference to FIG. 7.

At 1310, the method may include receiving a second control message including an indication to switch from communicating with the network entity in accordance with a first set of transmission parameters of the multiple sets of transmission parameters to communicating with the network entity in accordance with a second set of transmission parameters of the multiple sets of transmission parameters. The operations of 1310 may be performed in accordance with examples as disclosed herein. In some examples, aspects of the operations of 1310 may be performed by a switching indication component 730 as described with reference to FIG. 7.

At 1315, the method may include communicating one or more messages with the network entity based on a switch, in response to the second control message, from the first set of transmission parameters to the second set of transmission parameters in accordance with a parameter switching timeline for the dynamic transmission parameter adaptation. The operations of 1315 may be performed in accordance with examples as disclosed herein. In some examples, aspects of the operations of 1315 may be performed by an applied parameter set communication component 735 as described with reference to FIG. 7.

Figure 14:
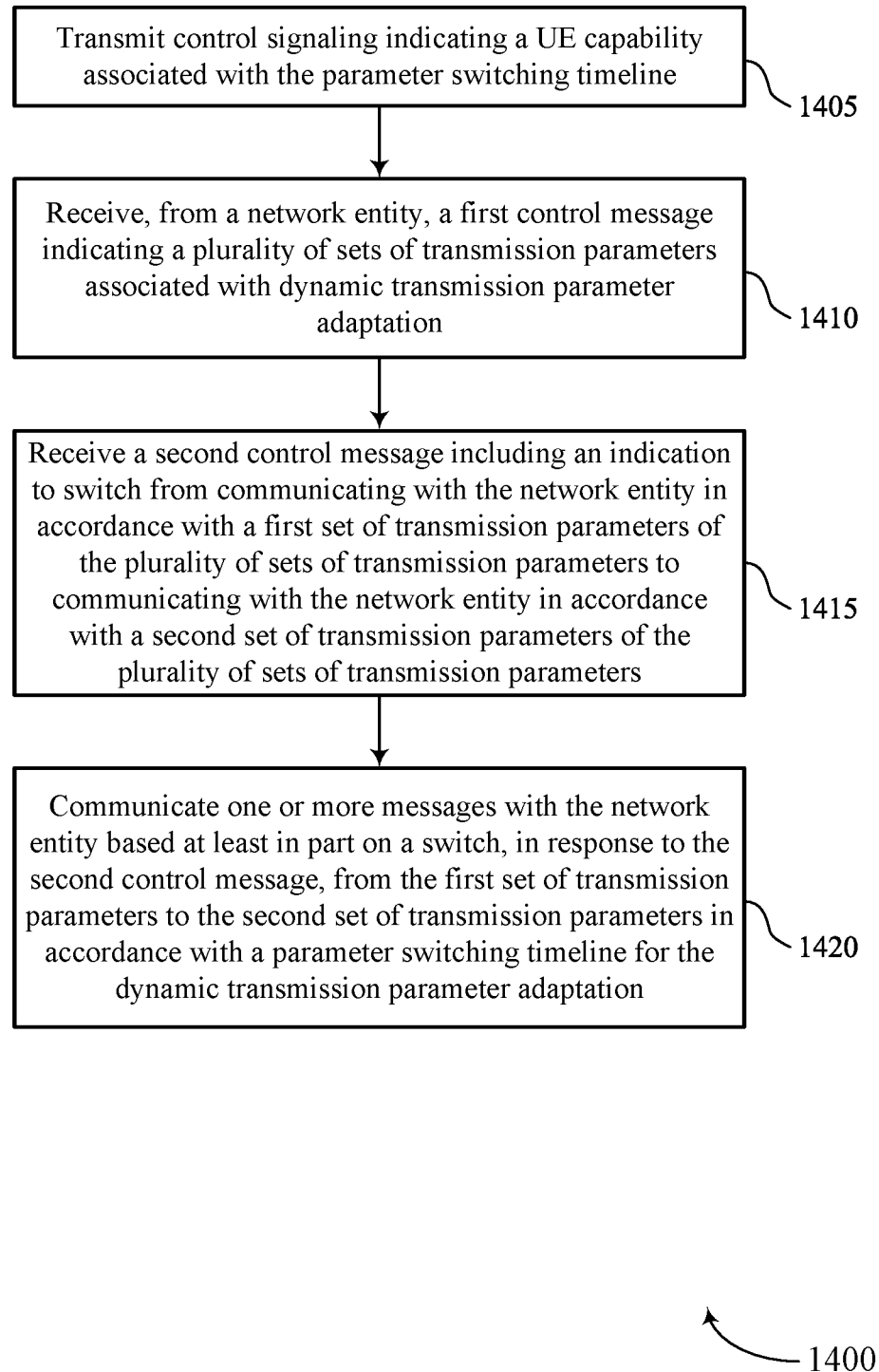

FIG. 14 shows a flowchart illustrating a method 1400 that supports techniques for dynamic transmission parameter adaptation in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include transmitting control signaling indicating a UE capability associated with the parameter switching timeline. The operations of 1405 may be performed in accordance with examples as disclosed herein. In some examples, aspects of the operations of 1405 may be performed by a capability indication component 740 as described with reference to FIG. 7.

At 1410, the method may include receiving, from a network entity, a first control message indicating a set of multiple sets of transmission parameters associated with dynamic transmission parameter adaptation. The operations of 1410 may be performed in accordance with examples as disclosed herein. In some examples, aspects of the operations of 1410 may be performed by a parameter set configuration component 725 as described with reference to FIG. 7.

At 1415, the method may include receiving a second control message including an indication to switch from communicating with the network entity in accordance with a first set of transmission parameters of the multiple sets of transmission parameters to communicating with the network entity in accordance with a second set of transmission parameters of the multiple sets of transmission parameters. The operations of 1415 may be performed in accordance with examples as disclosed herein. In some examples, aspects of the operations of 1415 may be performed by a switching indication component 730 as described with reference to FIG. 7.

At 1420, the method may include communicating one or more messages with the network entity based on a switch, in response to the second control message, from the first set of transmission parameters to the second set of transmission parameters in accordance with a parameter switching timeline for the dynamic transmission parameter adaptation. The operations of 1420 may be performed in accordance with examples as disclosed herein. In some examples, aspects of the operations of 1420 may be performed by an applied parameter set communication component 735 as described with reference to FIG. 7.

Figure 15:
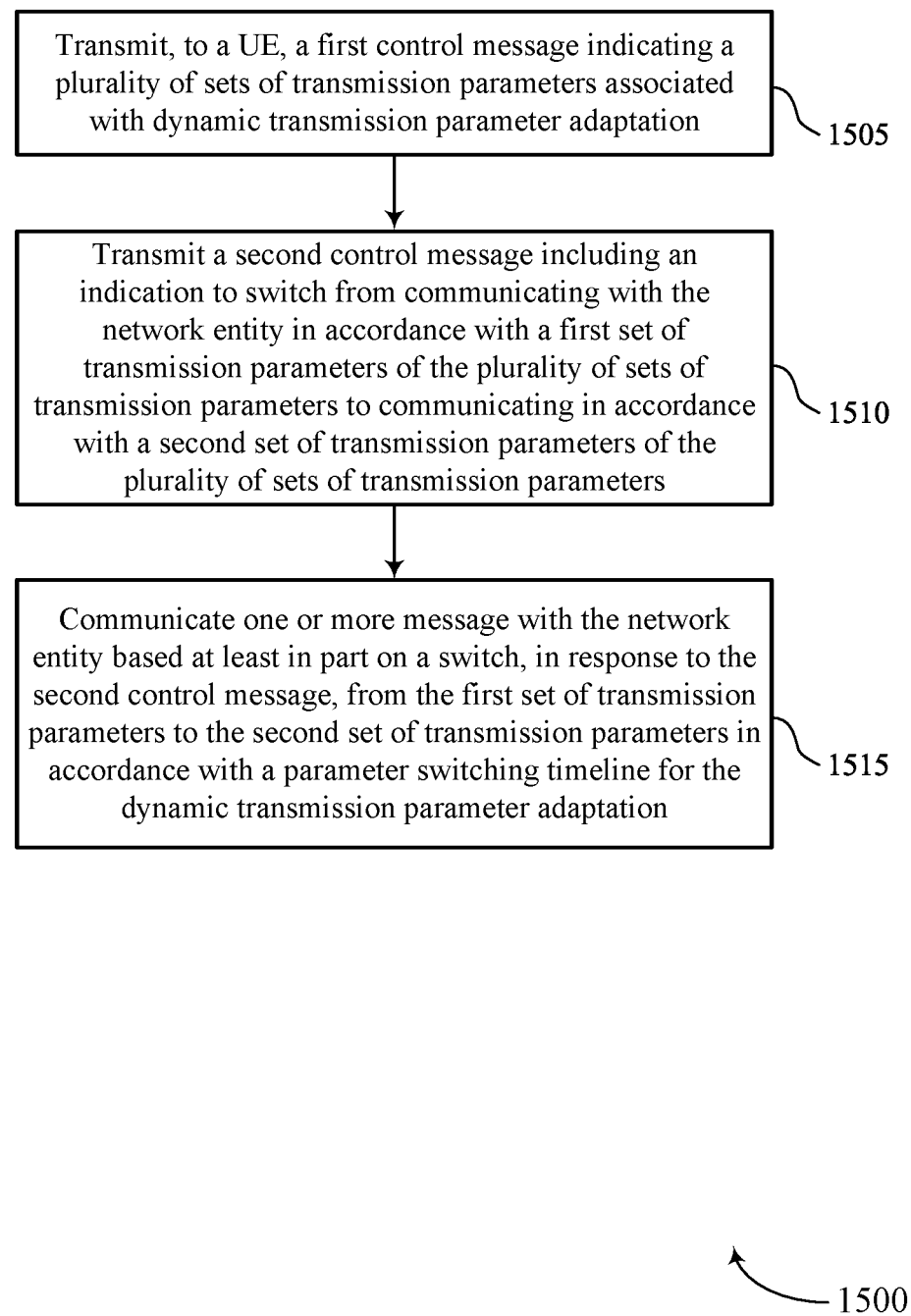

FIG. 15 shows a flowchart illustrating a method 1500 that supports techniques for dynamic transmission parameter adaptation in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include transmitting, to a UE, a first control message indicating a set of multiple sets of transmission parameters associated with dynamic transmission parameter adaptation. The operations of 1505 may be performed in accordance with examples as disclosed herein. In some examples, aspects of the operations of 1505 may be performed by a parameter set configuring component 1125 as described with reference to FIG. 11.

At 1510, the method may include transmitting a second control message including an indication to switch from communicating with the network entity in accordance with a first set of transmission parameters of the multiple sets of transmission parameters to communicating in accordance with a second set of transmission parameters of the multiple sets of transmission parameters. The operations of 1510 may be performed in accordance with examples as disclosed herein. In some examples, aspects of the operations of 1510 may be performed by a switching indication component 1130 as described with reference to FIG. 11.

At 1515, the method may include communicating one or more message with the network entity based on a switch, in response to the second control message, from the first set of transmission parameters to the second set of transmission parameters in accordance with a parameter switching timeline for the dynamic transmission parameter adaptation. The operations of 1515 may be performed in accordance with examples as disclosed herein. In some examples, aspects of the operations of 1515 may be performed by an applied parameter set communication component 1135 as described with reference to FIG. 11.

The following provides an overview of aspects of the present disclosure:

Aspect 1: A method for wireless communications at a UE, comprising: receiving, from a network entity, a first control message indicating a plurality of sets of transmission parameters associated with dynamic transmission parameter adaptation; receiving a second control message including an indication to switch from communicating with the network entity in accordance with a first set of transmission parameters of the plurality of sets of transmission parameters to communicating with the network entity in accordance with a second set of transmission parameters; and communicating one or more messages with the network entity based at least in part on a switch, in response to the second control message, from the first set of transmission parameters to the second set of transmission parameters in accordance with a parameter switching timeline for the dynamic transmission parameter adaptation of the plurality of sets of transmission parameters.

Aspect 2: The method of aspect 1, wherein the parameter switching timeline includes a first time gap for switching between the first set of transmission parameters to the second set of transmission parameters, a second time gap between receiving the indication and applying the second set of transmission parameters, and a third time gap between indications to switch sets of transmission parameters.

Aspect 3: The method of any of aspects 1 through 2, further comprising: transmitting control signaling indicating a UE capability associated with the parameter switching timeline.

Aspect 4: The method of aspect 3, wherein transmitting the control signaling comprises: transmitting the control signaling indicating a plurality of supported parameter switching timelines including at least the parameter switching timeline.

Aspect 5: The method of any of aspects 3 through 4, wherein transmitting the control signaling comprises: transmitting the control signaling indicating the parameter switching timeline from a plurality of parameter switching timelines.

Aspect 6: The method of any of aspects 3 through 5, wherein transmitting the control signaling comprises: transmitting the control signaling indicating a first supported time gap for switching between the first set of transmission parameters to the second set of transmission parameters, a second supported time gap between receiving the indication and applying the second set of transmission parameters, and a third supported time gap between indications to switch sets of transmission parameters, or any combination thereof.

Aspect 7: The method of any of aspects 1 through 6, wherein receiving the second control message comprises: receiving a downlink control information message including a first indication to switch from the first set of transmission parameters to the second set of transmission parameters, wherein a timer associated with the switch begins from a last symbol of a control resource set used to transmit the downlink control information message.

Aspect 8: The method of any of aspects 1 through 7, wherein receiving the second control message comprises: receiving a medium access control message including a first indication to switch from the first set of transmission parameters to the second set of transmission parameters; and transmitting a feedback message in response to the medium access control message, wherein a timer associated with the switch begins from a slot used to transmit the feedback message.

Aspect 9: The method of any of aspects 1 through 8, further comprising: receiving control signaling indicating that a timer duration associated with the switch begins from a last symbol of a control resource set used to transmit the control signaling.

Aspect 10: The method of any of aspects 1 through 9, wherein the parameter switching timeline is based at least in part on a subcarrier spacing of a physical channel.

Aspect 11: The method of any of aspects 1 through 10, further comprising: receiving control signaling indicating a subcarrier spacing associated with the parameter switching timeline.

Aspect 12: The method of any of aspects 1 through 11, wherein the parameter switching timeline is based at least in part on a first time gap for switching between the first set of transmission parameters to the second set of transmission parameters, a second time gap between receiving the indication and applying the second set of transmission parameters, and a third time gap between indications to switch sets of transmission parameters, or any combination thereof.

Aspect 13: The method of aspect 12, wherein the first time gap, the second time gap, or the third time gap, or any combination thereof, correspond to a quantity of symbols, slots, or frames, or any combination thereof.

Aspect 14: The method of any of aspects 1 through 13, further comprising: dropping a scheduled communication during a time gap after switching to the second set of transmission parameters and before communicating in accordance with the second set of transmission parameters.

Aspect 15: The method of any of aspects 1 through 14, further comprising: transmitting a scheduled message after receiving the second control message and before switching to the second set of transmission parameters in accordance with the first set of transmission parameters and the parameter switching timeline.

Aspect 16: The method of any of aspects 1 through 15, further comprising: receiving a scheduled message after receiving the second control message and before switching to the second set of transmission parameters in accordance with the first set of transmission parameters and the parameter switching timeline.

Aspect 17: The method of any of aspects 1 through 16, further comprising: dropping a scheduled communication after receiving the second control message and before switching to the second set of transmission parameters in accordance with the parameter switching timeline.

Aspect 18: A method for wireless communications at a network entity, comprising: transmitting, to a UE, a first control message indicating a plurality of sets of transmission parameters associated with dynamic transmission parameter adaptation; transmitting a second control message including an indication to switch from communicating with the network entity in accordance with a first set of transmission parameters of the plurality of sets of transmission parameters to communicating in accordance with a second set of transmission parameters of the plurality of sets of transmission parameters; and communicating one or more message with the network entity based at least in part on a switch, in response to the second control message, from the first set of transmission parameters to the second set of transmission parameters in accordance with a parameter switching timeline for the dynamic transmission parameter adaptation.

Aspect 19: The method of aspect 18, further comprising: receiving control signaling indicating a UE capability associated with the parameter switching timeline.

Aspect 20: The method of aspect 19, wherein receiving the control signaling comprises: receiving the control signaling indicating a plurality of supported parameter switching timelines including at least the parameter switching timeline.

Aspect 21: The method of any of aspects 19 through 20, wherein receiving the control signaling comprises: receiving the control signaling indicating the parameter switching timeline from a plurality of parameter switching timelines.

Aspect 22: The method of any of aspects 19 through 21, wherein receiving the control signaling comprises: receiving the control signaling indicating a first supported time gap for switching between the first set of transmission parameters to the second set of transmission parameters, a second supported time gap between receiving the indication and applying the second set of transmission parameters, and a third supported time gap between indications to switch sets of transmission parameters, or any combination thereof.

Aspect 23: The method of any of aspects 18 through 22, wherein transmitting the second control message comprises: transmitting a downlink control information message including a first indication to switch from the first set of transmission parameters to the second set of transmission parameters, wherein a timer associated with the switch begins from a last symbol of a control resource set used to transmit the downlink control information message.

Aspect 24: The method of any of aspects 18 through 23, wherein transmitting the second control message comprises: transmitting a medium access control message including a first indication to switch from the first set of transmission parameters to the second set of transmission parameters; and receiving a feedback message in response to the medium access control message, wherein a timer associated with the switch begins from a slot used to transmit the feedback message.

Aspect 25: The method of any of aspects 18 through 24, further comprising: transmitting control signaling indicating that a timer duration associated with the switch begins from a last symbol of a control resource set used to transmit the control signaling.

Aspect 26: The method of any of aspects 18 through 25, further comprising: transmitting control signaling indicating a subcarrier spacing associated with the parameter switching timeline.

Aspect 27: The method of any of aspects 18 through 26, further comprising: receiving a scheduled message after receiving the second control message and before switching to the first set of transmission parameters in accordance with the first set of transmission parameters and the parameter switching timeline.

Aspect 28: The method of any of aspects 18 through 27, further comprising: transmitting a scheduled message after receiving the second control message and before switching to the first set of transmission parameters in accordance with the first set of transmission parameters and the parameter switching timeline.

Aspect 29: An apparatus for wireless communications at a UE, comprising a processor; memory coupled with the processor; and instructions stored in the memory and executable by the processor to cause the apparatus to perform a method of any of aspects 1 through 17.

Aspect 30: An apparatus for wireless communications at a UE, comprising at least one means for performing a method of any of aspects 1 through 17.

Aspect 31: A non-transitory computer-readable medium storing code for wireless communications at a UE, the code comprising instructions executable by a processor to perform a method of any of aspects 1 through 17.

Aspect 32: An apparatus for wireless communications at a network entity, comprising a processor; memory coupled with the processor; and instructions stored in the memory and executable by the processor to cause the apparatus to perform a method of any of aspects 18 through 28.

Aspect 33: An apparatus for wireless communications at a network entity, comprising at least one means for performing a method of any of aspects 18 through 28.

Aspect 34: A non-transitory computer-readable medium storing code for wireless communications at a network entity, the code comprising instructions executable by a processor to perform a method of any of aspects 18 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
    one or more processors;
    one or more memories coupled with the one or more processors; and
    instructions stored in the one or more memories and executable by the one or more processors to cause the apparatus to:
        transmit a capability message indicating a plurality of parameter switching timelines supported by a user equipment (UE);
        receive, from a network entity, a first control message indicating a plurality of sets of transmission parameters associated with dynamic transmission parameter adaptation;
        receive, via a physical channel, a second control message including an indication to switch from communicating with the network entity in accordance with a first set of transmission parameters of the plurality of sets of transmission parameters to communicating with the network entity in accordance with a second set of transmission parameters of the plurality of sets of transmission parameters; and
        communicate one or more messages with the network entity based at least in part on a switch, in response to the second control message, from the first set of transmission parameters to the second set of transmission parameters in accordance with a parameter switching timeline for the dynamic transmission parameter adaptation of the plurality of parameter switching timelines supported by the UE, wherein the parameter switching timeline is based at least in part on a subcarrier spacing of the physical channel carrying the second control message.

2. The apparatus of claim 1, wherein the parameter switching timeline includes a first time gap for switching between the first set of transmission parameters to the second set of transmission parameters, a second time gap between receiving the indication and applying the second set of transmission parameters, and a third time gap between indications to switch sets of transmission parameters.

3. The apparatus of claim 1, wherein the capability message indicates the parameter switching timeline from the plurality of switching timelines.

4. The apparatus of claim 1, wherein
    the capability message indicates a first supported time gap for switching between the first set of transmission parameters to the second set of transmission parameters, a second supported time gap between receiving the indication and applying the second set of transmission parameters, and a third supported time gap between indications to switch sets of transmission parameters, or any combination thereof.

5. The apparatus of claim 1, wherein the instructions to receive the second control message are executable by the one or more processors to cause the apparatus to:
    receive a downlink control information message including a first indication to switch from the first set of transmission parameters to the second set of transmission parameters, wherein a timer associated with the switch begins from a last symbol of a control resource set used to transmit the downlink control information message.

6. The apparatus of claim 1, wherein the instructions to receive the second control message are executable by the one or more processors to cause the apparatus to:
    receive a medium access control message including a first indication to switch from the first set of transmission parameters to the second set of transmission parameters; and
    wherein the instructions are further executable by the one or more processors to cause the apparatus to:
    transmit a feedback message in response to the medium access control message, wherein a timer associated with the switch begins from a slot used to transmit the feedback message.

7. The apparatus of claim 1, wherein the instructions are further executable by the one or more processors to cause the apparatus to:
    receive control signaling indicating that a timer duration, associated with the switch, begins from a last symbol of a control resource set used to transmit the control signaling.

8. The apparatus of claim 1, wherein the instructions are further executable by the one or more processors to cause the apparatus to:
    receive control signaling indicating the subcarrier spacing associated with the parameter switching timeline.

9. The apparatus of claim 1, wherein the parameter switching timeline is based at least in part on a first time gap for switching between the first set of transmission parameters to the second set of transmission parameters, a second time gap between receiving the indication and applying the second set of transmission parameters, and a third time gap between indications to switch sets of transmission parameters, or any combination thereof.

10. The apparatus of claim 9, wherein the first time gap, the second time gap, or the third time gap, or any combination thereof, correspond to a quantity of symbols, slots, or frames, or any combination thereof.

11. The apparatus of claim 1, wherein the instructions are further executable by the one or more processors to cause the apparatus to:
drop a scheduled communication during a time gap after switching to the second set of transmission parameters and before communicating in accordance with the second set of transmission parameters.

12. The apparatus of claim 1, wherein the instructions are further executable by the one or more processors to cause the apparatus to:
transmit a scheduled message after receiving the second control message and before switching to the second set of transmission parameters in accordance with the first set of transmission parameters and the parameter switching timeline.

13. The apparatus of claim 1, wherein the instructions are further executable by the one or more processors to cause the apparatus to:
receive a scheduled message after receiving the second control message and before switching to the second set of transmission parameters in accordance with the first set of transmission parameters and the parameter switching timeline.

14. The apparatus of claim 1, wherein the instructions are further executable by the one or more processors to cause the apparatus to:
drop a scheduled communication after receiving the second control message and before switching to the second set of transmission parameters in accordance with the parameter switching timeline.

15. An apparatus for wireless communications at a network entity, comprising:
one or more processors;
one or more memories coupled with the one or more processors; and
instructions stored in the one or more memories and executable by the one or more processors to cause the apparatus to:
receive a capability message indicating a plurality of parameter switching timelines supported by a user equipment (UE);
transmit, to the UE, a first control message indicating a plurality of sets of transmission parameters associated with dynamic transmission parameter adaptation;
transmit, via a physical channel, a second control message including an indication to switch from communicating with the network entity in accordance with a first set of transmission parameters of the plurality of sets of transmission parameters to communicating in accordance with a second set of transmission parameters of the plurality of sets of transmission parameters; and
communicate one or more message with the network entity based at least in part on a switch, in response to the second control message, from the first set of transmission parameters to the second set of transmission parameters in accordance with a parameter switching timeline for the dynamic transmission parameter adaptation of the plurality of parameter switching timelines supported by the UE, wherein the parameter switching timeline is based at least in part on a subcarrier spacing of the physical channel carrying the second control message.

16. The apparatus of claim 15, wherein
the capability message indicates the parameter switching timeline from a plurality of parameter switching timelines.

17. The apparatus of claim 15, wherein
the capability message indicates a first supported time gap for switching between the first set of transmission parameters to the second set of transmission parameters, a second supported time gap between receiving the indication and applying the second set of transmission parameters, and a third supported time gap between indications to switch sets of transmission parameters, or any combination thereof.

18. The apparatus of claim 15, wherein the instructions to transmit the second control message are executable by the one or more processors to cause the apparatus to:
transmit a downlink control information message including a first indication to switch from the first set of transmission parameters to the second set of transmission parameters, wherein a timer associated with the switch begins from a last symbol of a control resource set used to transmit the downlink control information message.

19. The apparatus of claim 15, wherein the instructions to transmit the second control message are executable by the one or more processors to cause the apparatus to:
transmit a medium access control message including a first indication to switch from the first set of transmission parameters to the second set of transmission parameters; and
wherein the instructions are further executable by the one or more processors to cause the apparatus to:
receive a feedback message in response to the medium access control message, wherein a timer associated with the switch begins from a slot used to transmit the feedback message.

20. The apparatus of claim 15, wherein the instructions are further executable by the one or more processors to cause the apparatus to:
transmit control signaling indicating that a timer duration, associated with the switch, begins from a last symbol of a control resource set used to transmit the control signaling.

21. The apparatus of claim 15, wherein the instructions are further executable by the one or more processors to cause the apparatus to:
transmit control signaling indicating the subcarrier spacing associated with the parameter switching timeline.

22. The apparatus of claim 15, wherein the instructions are further executable by the one or more processors to cause the apparatus to:
receive a scheduled message after receiving the second control message and before switching to the first set of transmission parameters in accordance with the first set of transmission parameters and the parameter switching timeline.

23. The apparatus of claim 15, wherein the instructions are further executable by the one or more processors to cause the apparatus to:
transmit a scheduled message after receiving the second control message and before switching to the first set of transmission parameters in accordance with the first set of transmission parameters and the parameter switching timeline.

24. A method for wireless communications at a user equipment (UE), comprising:
- transmitting a capability message indicating a plurality of parameter switching timelines supported by the UE;
- receiving, from a network entity, a first control message indicating a plurality of sets of transmission parameters associated with dynamic transmission parameter adaptation;
- receiving, via a physical channel, a second control message including an indication to switch from communicating with the network entity in accordance with a first set of transmission parameters of the plurality of sets of transmission parameters to communicating with the network entity in accordance with a second set of transmission parameters of the plurality of sets of transmission parameters; and
- communicating one or more messages with the network entity based at least in part on a switch, in response to the second control message, from the first set of transmission parameters to the second set of transmission parameters in accordance with a parameter switching timeline for the dynamic transmission parameter adaptation of the plurality of parameter switching timelines supported by the UE, wherein the parameter switching timeline is based at least in part on a subcarrier spacing of the physical channel carrying the second control message.

25. A method for wireless communications at a network entity, comprising:
- receiving a capability message indicating a plurality of parameter switching timelines supported by a user equipment (UE);
- transmitting, to the UE, a first control message indicating a plurality of sets of transmission parameters associated with dynamic transmission parameter adaptation;
- transmitting, via a physical channel, a second control message including an indication to switch from communicating with the network entity in accordance with a first set of transmission parameters of the plurality of sets of transmission parameters to communicating in accordance with a second set of transmission parameters of the plurality of sets of transmission parameters; and
- communicating one or more message with the network entity based at least in part on a switch, in response to the second control message, from the first set of transmission parameters to the second set of transmission parameters in accordance with a parameter switching timeline for the dynamic transmission parameter adaptation of the plurality of parameter switching timelines supported by the UE, wherein the parameter switching timeline is based at least in part on a subcarrier spacing of the physical channel carrying the second control message.

* * * * *